United States Patent
Nishikata et al.

(10) Patent No.: US 11,181,347 B2
(45) Date of Patent: Nov. 23, 2021

(54) UNDERWATER OBJECT DESTRUCTION SYSTEM AND UNDERWATER OBJECT DESTRUCTION METHOD

(71) Applicant: MITSUBISHI HEAVY INDUSTRIES, LTD., Tokyo (JP)

(72) Inventors: Shingo Nishikata, Tokyo (JP); Hiroshi Ikebuchi, Tokyo (JP); Yukito Hata, Tokyo (JP); Yuichi Araki, Tokyo (JP); Koichi Hamamoto, Tokyo (JP); Tomoya Morioka, Tokyo (JP); Atsushi Ochiai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 450 days.

(21) Appl. No.: 16/325,083

(22) PCT Filed: Feb. 14, 2017

(86) PCT No.: PCT/JP2017/005219
§ 371 (c)(1),
(2) Date: Feb. 12, 2019

(87) PCT Pub. No.: WO2018/087939
PCT Pub. Date: May 17, 2018

(65) Prior Publication Data
US 2021/0285745 A1    Sep. 16, 2021

(30) Foreign Application Priority Data

Nov. 8, 2016   (JP) .............................. JP2016-218229

(51) Int. Cl.
| | |
|---|---|
| *F41H 13/00* | (2006.01) |
| *G02B 19/00* | (2006.01) |
| *F41H 11/02* | (2006.01) |
| *B63G 13/00* | (2006.01) |

(52) U.S. Cl.
CPC .......... *F41H 13/0062* (2013.01); *B63G 13/00* (2013.01); *F41H 11/02* (2013.01); *G02B 19/0047* (2013.01)

(58) Field of Classification Search
CPC ................................................... F41H 13/0062
See application file for complete search history.

(56) References Cited

U.S. PATENT DOCUMENTS

| | | | |
|---|---|---|---|
| 6,910,658 B1 | 6/2005 | Hart et al. | |
| 9,088,123 B2 * | 7/2015 | Jones | ......................... H01S 1/04 |
| 10,342,111 B2 * | 7/2019 | Nishikata | .............. F41H 13/005 |
| 2003/0127558 A1 | 7/2003 | Heizmann-Bartels | |
| 2003/0233931 A1 | 12/2003 | Nemtsev | |

(Continued)

OTHER PUBLICATIONS

Extended European Search Report dated Jul. 10, 2019 in corresponding European Patent Application No. 17869406.3.

(Continued)

*Primary Examiner* — Reginald S Tillman, Jr.
(74) *Attorney, Agent, or Firm* — Wenderoth, Lind & Ponack, L.L.P.

(57) ABSTRACT

A laser beam is condensed in a close position to a target object in underwater so as to generate an air bubble or plasma. The target object is efficiently destroyed by a shock by the air bubble or the plasma.

13 Claims, 25 Drawing Sheets

(56) References Cited

U.S. PATENT DOCUMENTS

2013/0148685 A1 6/2013 Jones et al.
2016/0097616 A1 4/2016 Weigold

OTHER PUBLICATIONS

International Preliminary Report on Patentability and Written Opinion of the International Searching Authority dated Apr. 11, 2017 in International (PCT) Application No. PCT/JP2017/005219.
International Search Report dated Apr. 11, 2017 in International (PCT) Application No. PCT/JP2017/005219.

* cited by examiner

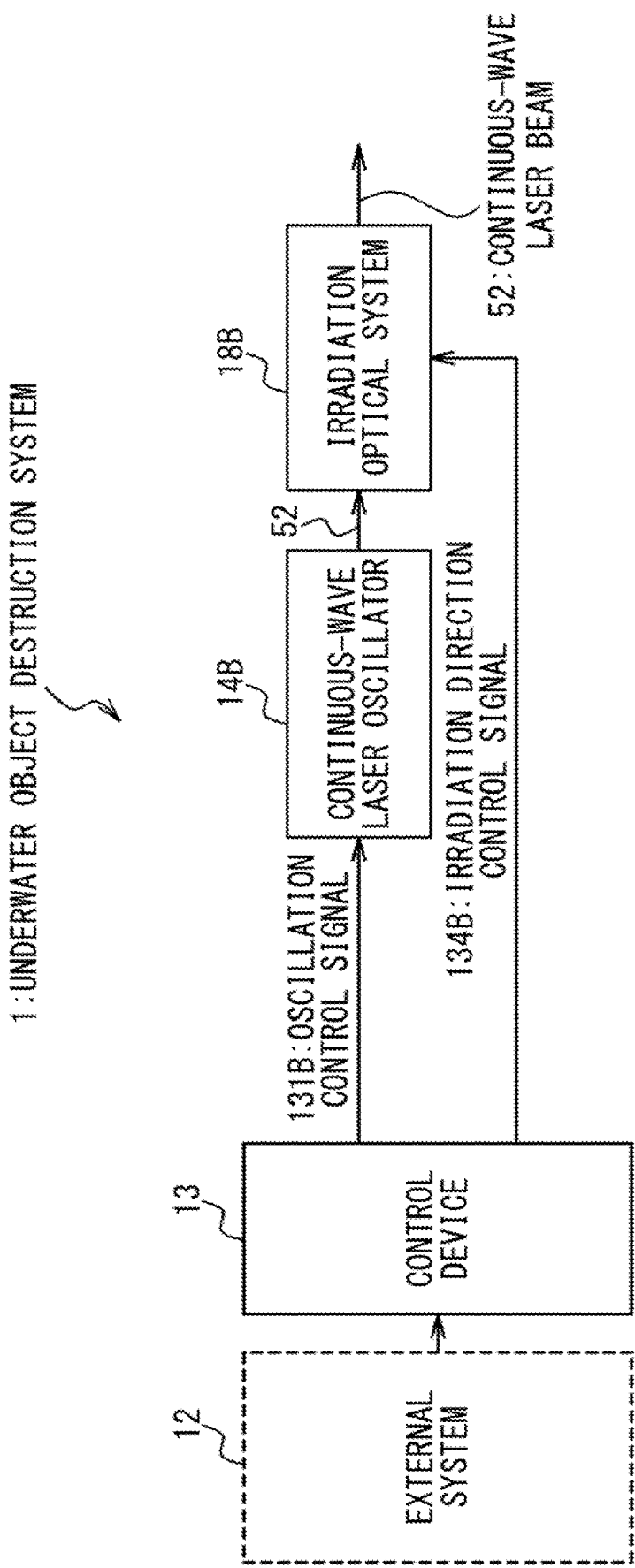

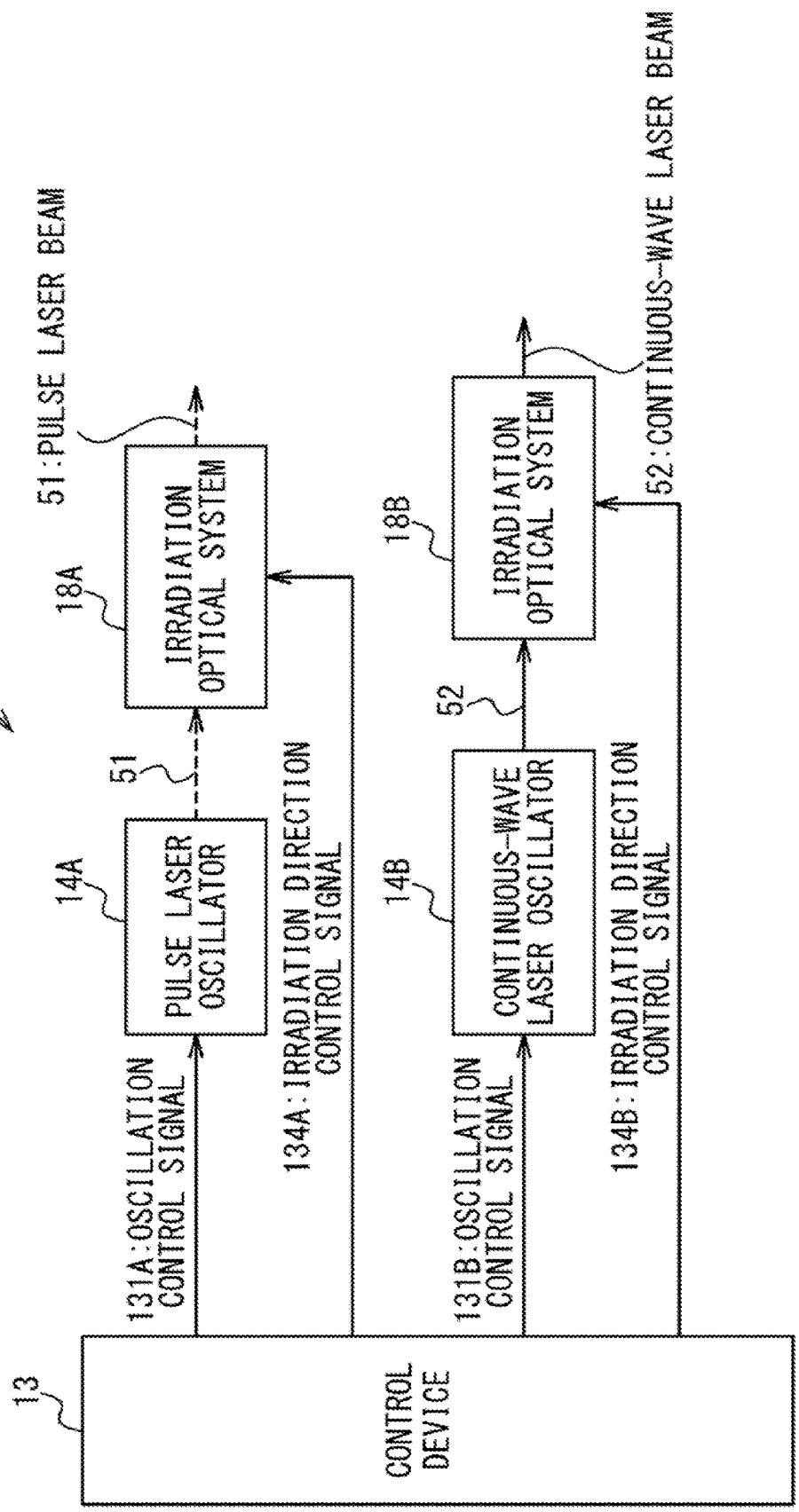

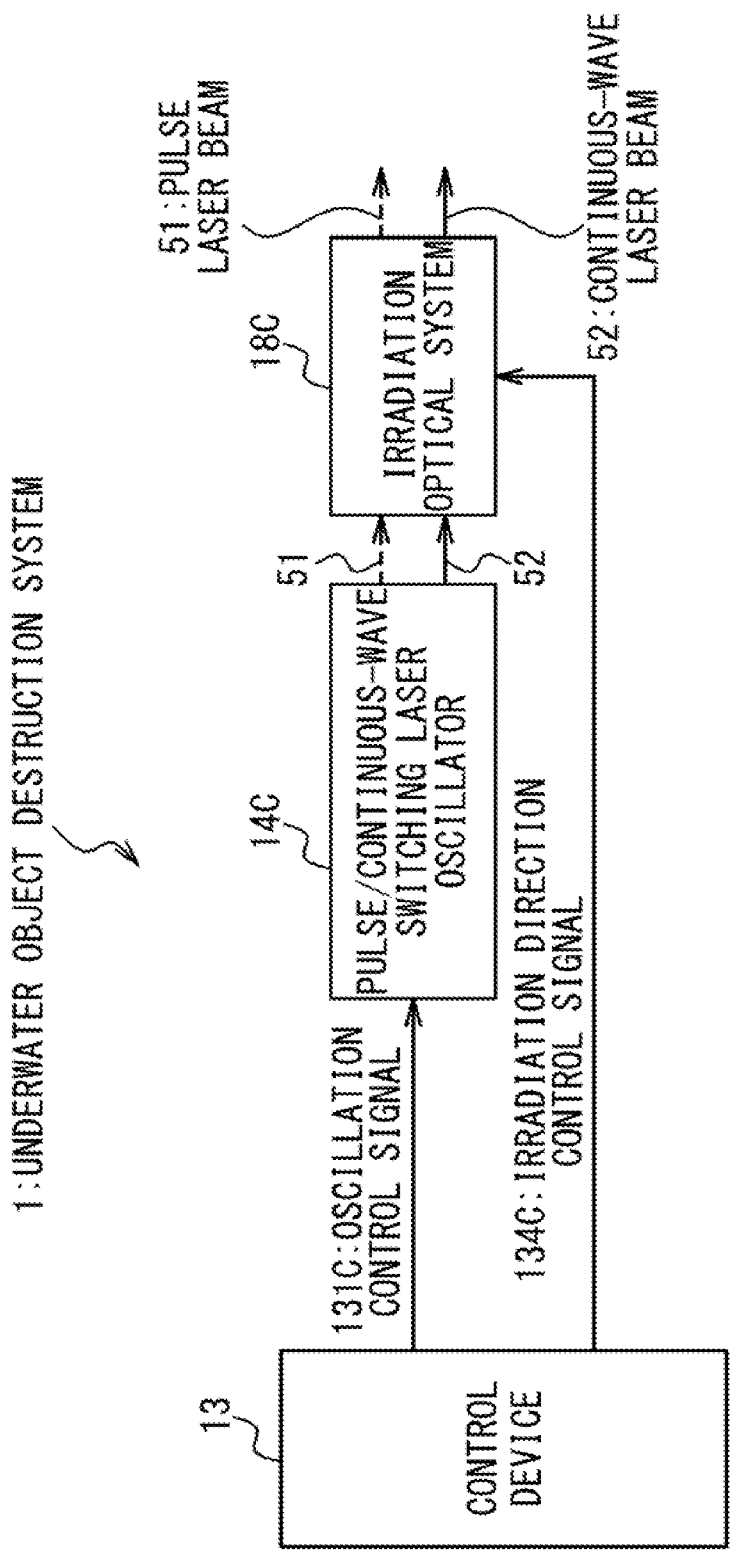

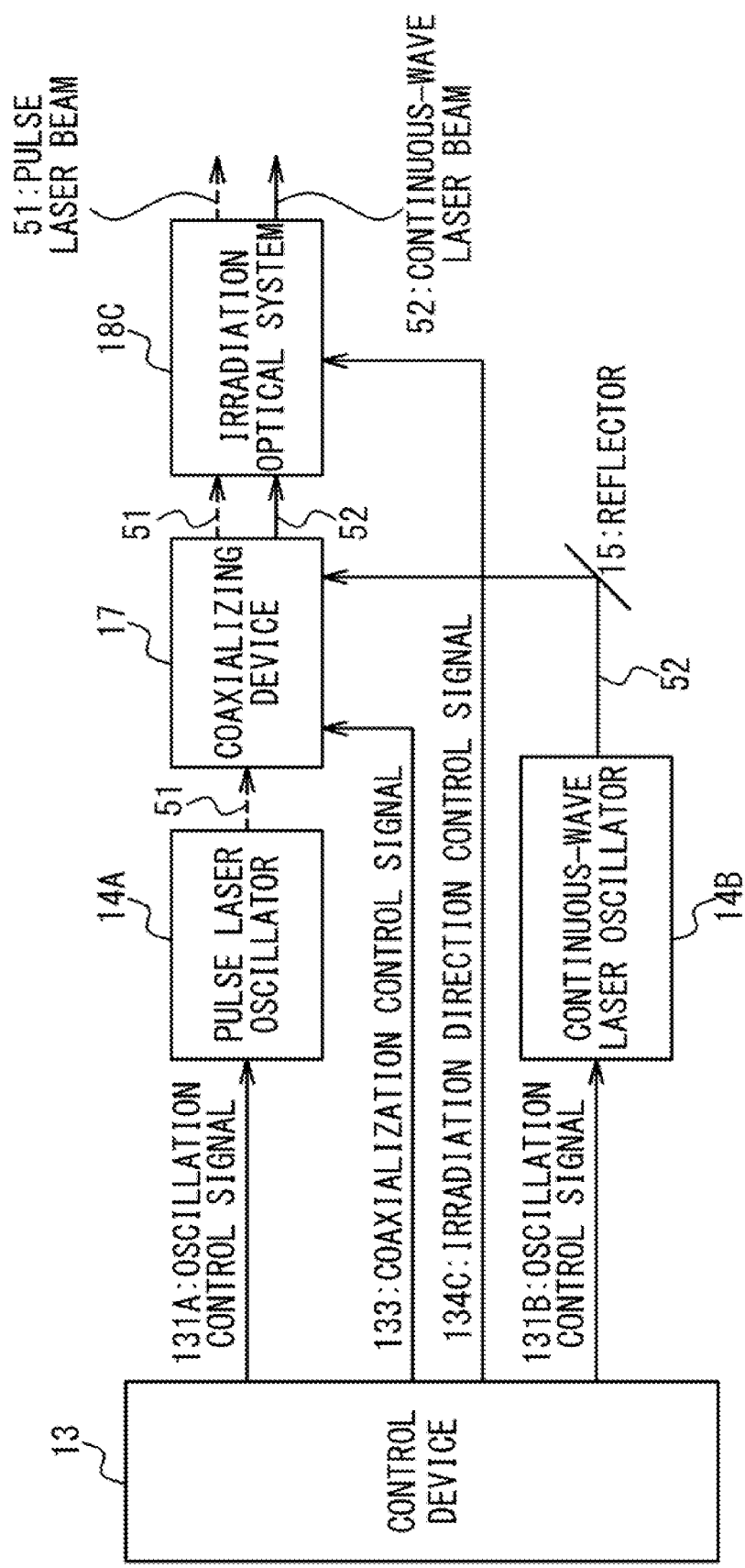

UNDERWATER OBJECT DESTRUCTION SYSTEM AND UNDERWATER OBJECT DESTRUCTION METHOD

TECHNICAL FIELD

The present invention relates to an underwater object destruction system and an underwater object destruction method, and to the underwater object destruction system and the underwater object destruction method, which use a laser beam.

BACKGROUND ART

As main attack means in underwater, a torpedo is known. The torpedo destroys a ship by a shock wave and a bubble jet generated through explosion of explosives. These powers become large and cause a great threat to a surface ship in addition to a submarine.

Many of the torpedoes tack a target while searching a sound source of the target. Therefore, many defense systems have been studied and developed to defend against the torpedo through deception of the sound source and use of a decoy. However, there are few defense systems which aim at the destruction of the torpedo.

On the other hand, the studies and developments of a destruction apparatus using a high-power laser beam are being accomplished in every country. This is the one which the high-power laser beam is irradiated to a target to destroy the target.

In relation to the above, Patent Literature 1 (US 2003/0127558 A1) discloses a system which detects a threat by a laser beam and an underwater vehicle and is used in an underwater object opposing them. This system includes a laser beam detection section, a laser beam warning receiver and a signal processor. Here, the laser beam detection section detects a laser beam emitted from the surface of the underwater vehicle. The laser beam warning receiver and the signal processor are connected with the laser beam detection section and control the laser beam detection section.

However, the laser beam usually attenuates greatly in the underwater. Therefore, it is difficult to irradiate a laser beam directly for a torpedo in the underwater and to destroy this, like Patent Literature 1.

CITATION LIST

Patent Literature

[Patent Literature 1] US 2003/0127558 A1

SUMMARY OF THE INVENTION

A system and a method are provided to effectively destroy an underwater object by using a laser beam. Other problems and new features will become clear from the description of this Specification and the attached drawings.

According to an embodiment, the underwater object destruction system includes an external unit such as a detecting device, a laser oscillator, an irradiation optical system and a control device.

Here, the detecting device detects a target object in underwater. The laser oscillator generates a laser beam. The irradiation optical system determines a direction and a condensing position of the laser beam generated by the laser oscillator. The control device controls the laser oscillator and the irradiation optical system such that the laser beam is condensed in a target position in underwater, which is determined in relation to the target object detected by the detecting device, to generate an air bubble or plasma. The underwater object destruction system destroys the target object with a shock by an air bubble or plasma.

According to an embodiment, an underwater object destruction method includes: detecting a target object in underwater; generating a laser beam; condensing the laser beam in a target position determined in relation to the target object to generate an air bubble or a plasma in the underwater; and destroying the target object with a shock due to the air bubble or the plasma.

According to the embodiment, the laser beam is condensed in a target position determined in relation to the underwater target object to generate the air bubble or the plasma, and the target object can be efficiently destroyed by the shock by the air bubble or the plasma.

BRIEF DESCRIPTION OF THE DRAWINGS

FIG. 9 is a block circuit diagram showing a configuration example of the underwater object destruction system according to a second embodiment.

FIG. 12A is a block circuit diagram showing a first configuration example of the underwater object destruction system according to a third embodiment.

FIG. 12C is a block circuit diagram showing a third configuration example of the underwater object destruction system according to the third embodiment.

FIG. 12D is a block circuit diagram showing a fifth configuration example of the underwater object destruction system according to the third embodiment.

DESCRIPTION OF EMBODIMENTS

Referring to the attached drawings, embodiments of an underwater object destruction system 1 and an underwater object destruction method of the present invention will be described below.

Figure 1A:
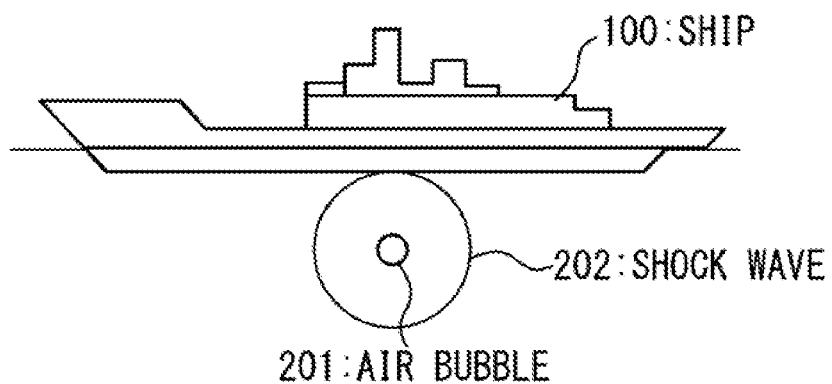
FIG. 1A is a diagram showing a first stage of a destruction method using a bubble jet by a torpedo.

First, referring to FIG. 1A to FIG. 1D, the above-mentioned bubble jet will be described in detail. FIG. 1A is a diagram showing a first stage of the destruction method using a bubble jet 204 by a torpedo 40. When the explosives of the torpedo 40 explode in a close position to a ship 100, an air bubble 201 is generated in underwater.

Figure 1B:
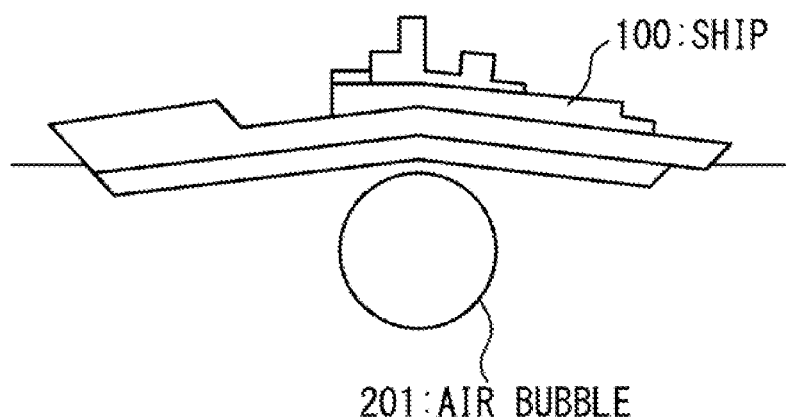
FIG. 1B is a diagram showing a second stage of the destruction method using the bubble jet by the torpedo.

FIG. 1B is a diagram showing a second stage of the destruction method using the bubble jet 204 by the torpedo 40. The air bubble 201 repeats expansion and shrinkage due to the interaction of atmospheric pressure inside the air bubble and water pressure outside the bubble. This phenomenon is called a bubble pulse.

Figure 1C:
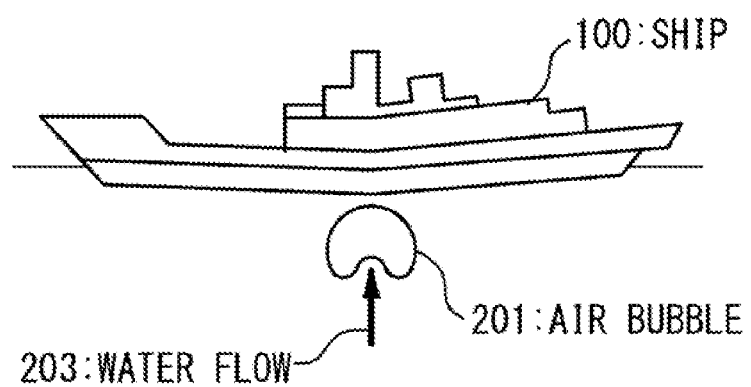
FIG. 1C is a diagram showing a third stage of the destruction method using the bubble jet by the torpedo.

FIG. 1C is a diagram showing a third stage of the destruction method using the bubble jet 204 by the torpedo 40. If the structure such as the bottom of a ship 100 exists near the air bubble 201 when the air bubble 201 shrinks, a pressure difference is caused between a surface of air bubble 201 on the side of the structure and a surface on the side opposite to the previously mentioned surface. As a result, the air bubble 201 hollows for the structure-side surface from the opposite-side surface so that a water flow 203 is generated.

Figure 1D:
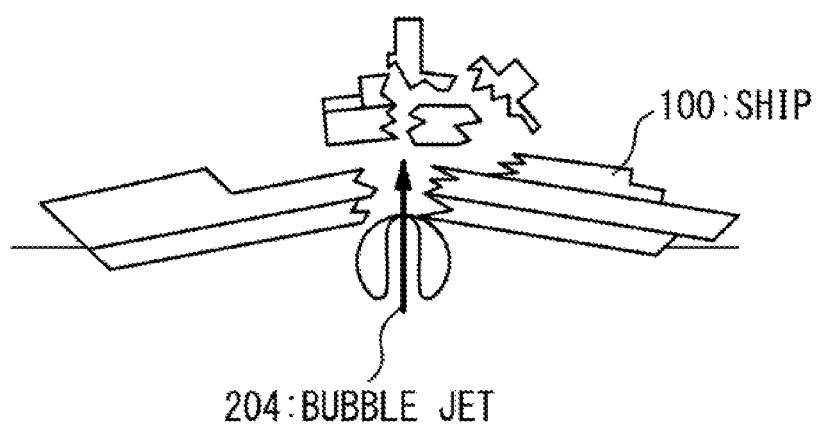
FIG. 1D is a diagram showing a fourth stage of the destruction method using the bubble jet by the torpedo.

FIG. 1D is a diagram showing a fourth stage of the destruction method using the bubble jet 204 by the torpedo 40. This water flow 203 becomes a bubble jet 204, and shows a great power which destroys the structure such as the ship 100. The power of this bubble jet 204 is stronger than a shock wave 202 due to the explosion of the explosives in many cases.

Figure 2:
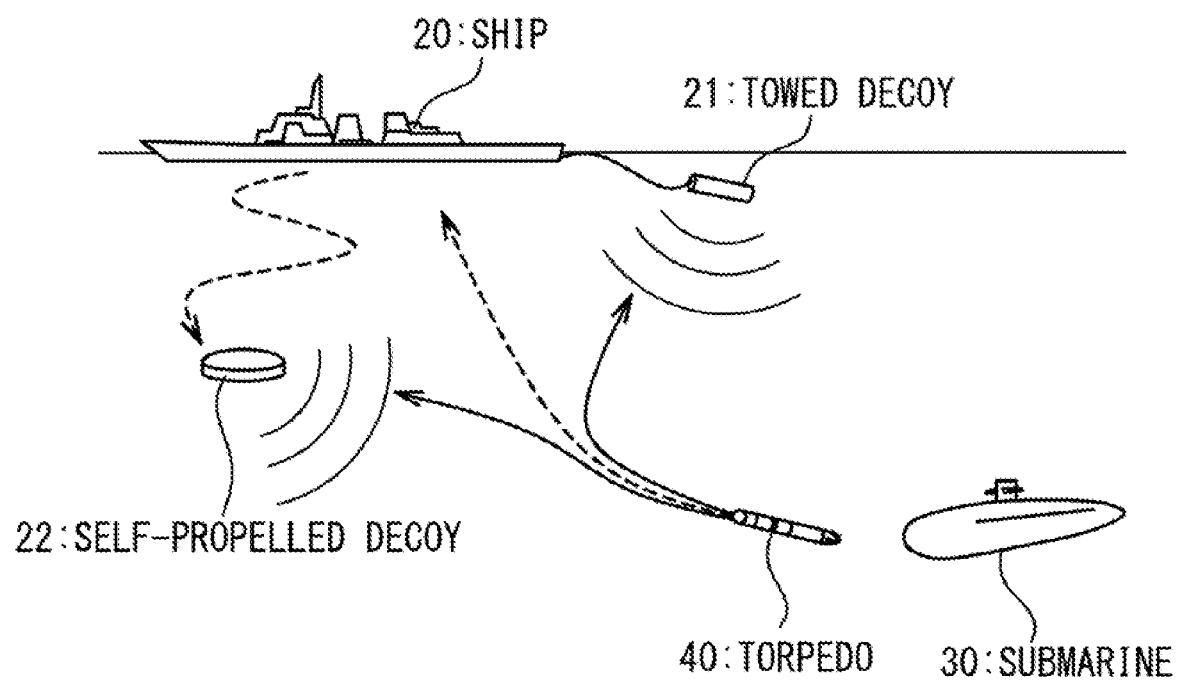
FIG. 2 is a diagram showing an example of a method of avoiding an attack by use of a torpedo.

Next, an example of method of defending against the above-mentioned torpedo will be described. FIG. 2 is a diagram showing an example of method of avoiding an attack of the torpedo 40. The torpedo 40 which is fired from a submarine 30 and so on detects a sound of a target in case of moving for the target such as a ship 20 and moves for the detected sound. The ship 20 as the target deceives the submarine 30 and the torpedo 40 by generating sounds in a position apart from the ship. Here, in the ship 20, the sounds may be sent from a towed decoy 21 and a self-propelled decoy 22. As a result that the sound source is deceived, the torpedo 40 moves for the decoy so that the ship 20 as the target can avoid the threat of the torpedo 40.

Figure 3:
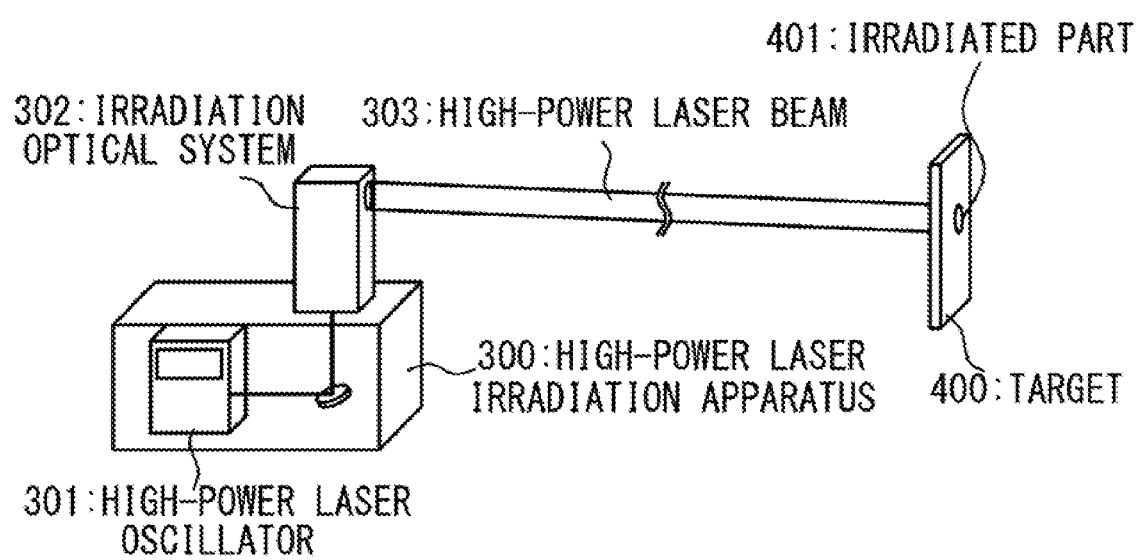
FIG. 3 is a diagram showing a configuration example of high-power laser irradiation apparatus.

Next, an example of the destruction apparatus using the above-mentioned high-power laser will be described. FIG. 3 is a diagram showing a configuration example of the high-power laser irradiation apparatus 300. In the example of FIG. 3, the high-power laser beam 303 is irradiated to a target 400 from the high-power laser irradiation apparatus 300. The high-power laser irradiation apparatus 300 generates the high-power laser beam 303 by using a high-power laser oscillator 301, and sets an irradiation direction of the high-power laser beam 303 for the target 400 by using an irradiation optical system 302. A part of the target 400 where the high-power laser beam 303 is irradiated is called an irradiated part 401 for convenience. As a result that the high-power laser beam 303 is irradiated, the target 400 is destroyed in part or all.

Such a high-power laser beam 303 attenuates in strength according to the distance to be propagated. However, the high-power laser irradiation apparatus 300 can destroy the target 400 from a position apart from the target 400 by about several kilometers when the high-power laser beam 303 propagates through the air. However, in case of propagating through the underwater, the high-power laser beam 303 attenuates more than the case of propagating through the air. Therefore, in the embodiments which will be described below, the laser beam is condensed in the underwater and locally boils the water to generate the air bubble. The bubble jet is generated by generating the air bubble in a target position determined in relation to the underwater object such as the torpedo 40, and the underwater object is destroyed with this bubble jet. Or, the laser beam is condensed into the underwater to generate plasma, and the underwater object is destroyed by a shock wave which accompanies the generation of plasma by generating this plasma in the target position determined in relation to the underwater object such as the torpedo 40, that is, based on the underwater object. In this case, the air bubble or plasma can be generated even after propagating through the underwater while attenuating in an area within, for example, 20 meters from the side of irradiation, or a further distant place.

First Embodiment

Figure 4:
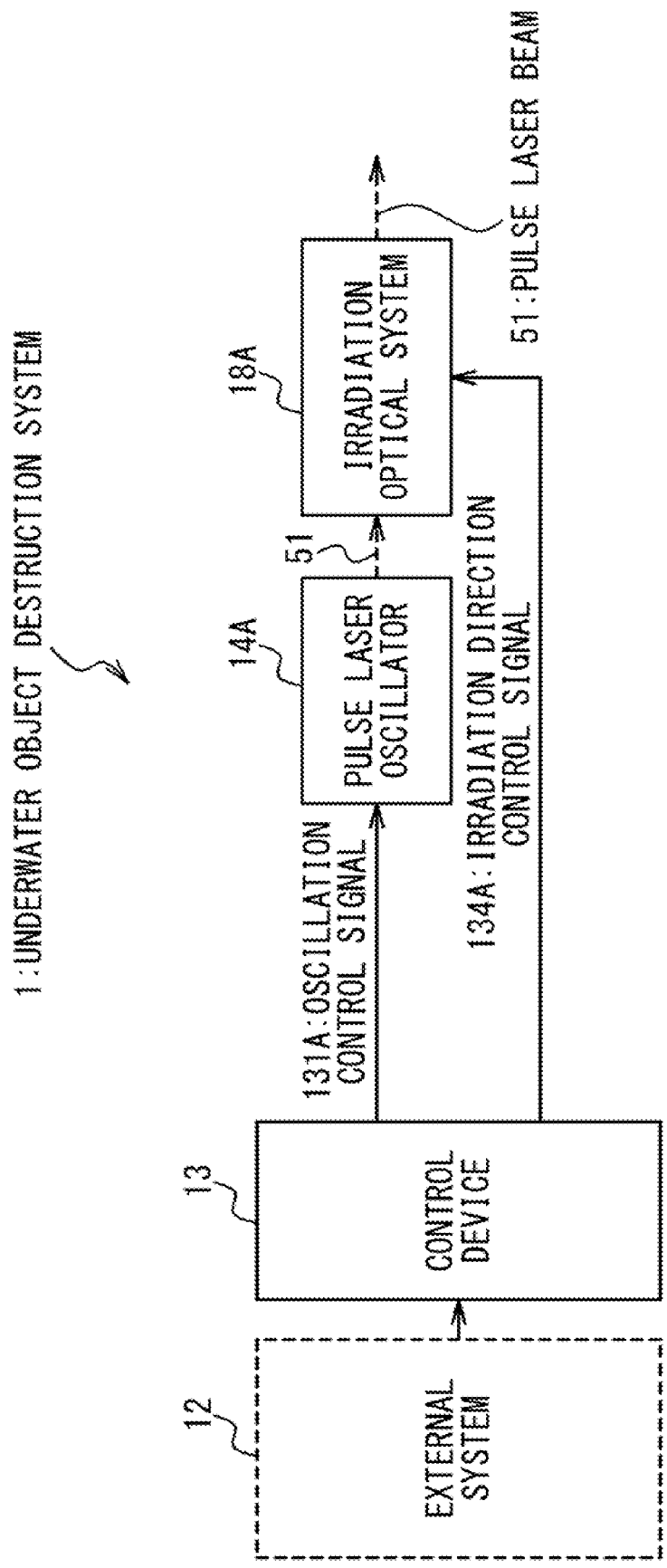
FIG. 4 is a block circuit diagram showing a configuration example of an underwater object destruction system according to a first embodiment.

FIG. 4 is a block circuit diagram showing a configuration example of the underwater object destruction system 1 according to a first embodiment. The components of the underwater object destruction system 1 shown in FIG. 4 will be described. The underwater object destruction system 1 of FIG. 4 includes an external system 12, a control device 13, and a pulse laser oscillator 14A and an irradiation optical system 18A. The external system 12 is, for example, a ship control system provided for the ship 20, and is desirable to have sonar to detect the existence of the underwater object such as the torpedo 40. The control device 13 may be a computer which includes an I/O interface to carry out the transmission and reception of a signal, a memory to store a program and data, and a CPU (Central Processing Unit) to execute a program on the memory to generate signals. The irradiation optical system 18A is desirable to include optical devices such as a lens and a reflector and a drive unit to adjust a position of the lens and an angle of the reflector, for the purpose of adjusting an irradiation direction and a focal length. The external system 12, the control device 13, the pulse laser oscillator 14A and the irradiation optical system 18A may be all provided in the ship 20 (not shown) and a part of them may be provided in the ship 20 and the remaining part may be provided in another place such as a decoy and an aircraft.

The connection relation of components of FIG. 4 will be described. Paying attention to the electric connection relation, the control device 13 is connected to an output side of the external system 12, and the pulse laser oscillator 14A and the irradiation optical system 18A are connected with an output side of the control device. Here, the electric connection relation may be realized in wire or radio. Paying attention to an optical connection relation, the irradiation optical system 18A is arranged on the output side of the pulse laser oscillator 14A. Note that the optical connection relation may be realized by using optical parts such as a mirror, a lens, a beam splitter (not shown).

Figure 5:
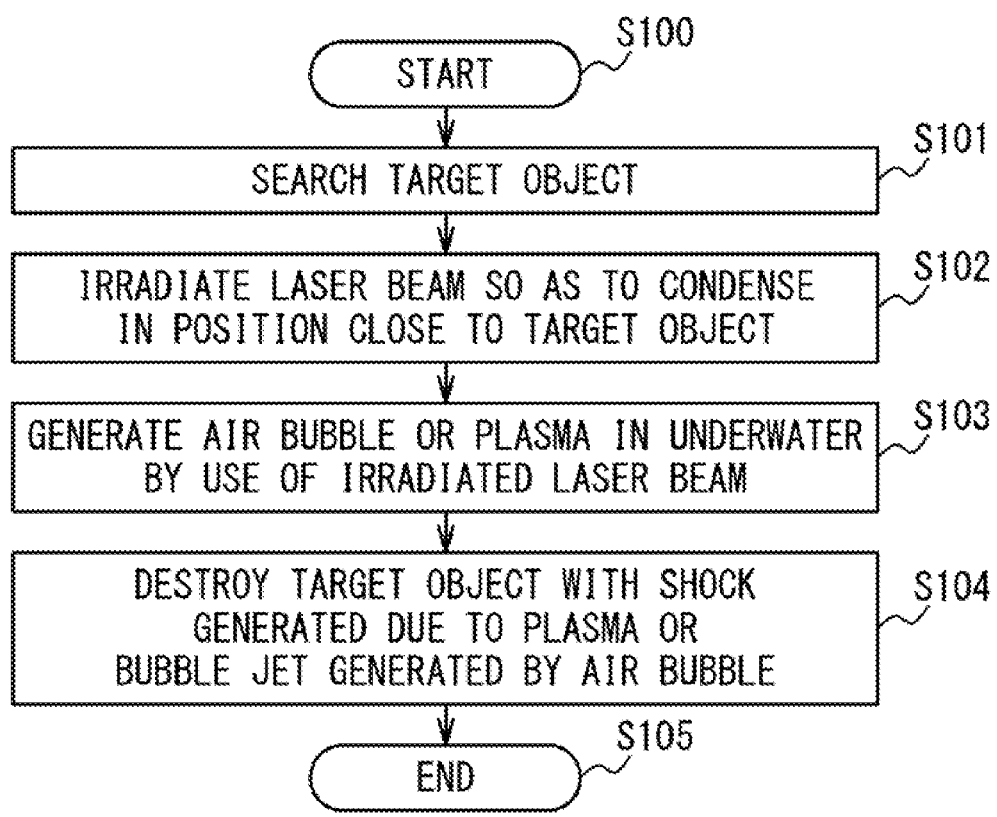
FIG. 5 is a flow chart showing an example of the underwater object destruction method according to the first embodiment.

The operation of the underwater object destruction system 1 shown in FIG. 4, i.e. the underwater object destruction method according to the present embodiment will be described with reference to FIG. 5 and FIG. 6A to FIG. 6E. FIG. 5 is a flow chart showing an example of the underwater object destruction method in the first embodiment. The flow chart of FIG. 5 contains 6 steps from a $0^{th}$ step S100 to a fifth step S105. The flow chart of FIG. 5 begins from the $0^{th}$ step S100. After the $0^{th}$ step S100, a first step S101 is executed.

Figure 6A:
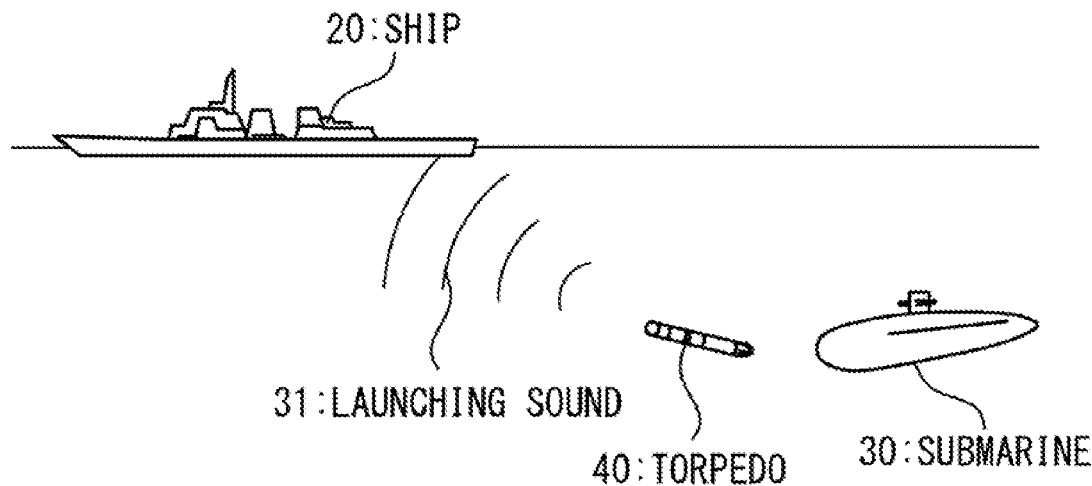
FIG. 6A is a diagram showing an example of state that the underwater object destruction system according to the first embodiment searches and detects a target object.

At the first step S101, the underwater object destruction system 1 detects the target object 40. More specifically, the external system 12 detects all kinds of sounds such as a firing sound 31 when the target object 40 is fired, a sailing sound when the target object 40 sails through the underwater, and other sounds, to detect a position, a moving direction and a moving speed of the torpedo as the underwater target object 40. FIG. 6A is a diagram showing an example of state that the underwater object destruction system 1 in the first embodiment detects the target object 40 such as the torpedo. When the target object 40 is detected, s second step S102 is executed after the first step S101.

At the second step S102, the underwater object destruction system 1 irradiates a pulse laser beam 51 such that the pulse laser beam 51 is condensed in a target position determined based on the speed and direction of the target object 40 and so on. More specifically, the external system 12 generates a detection signal 121 showing a detection result of the target object 40. The external system 12 transmits the detection signal 121 to the control device 13. The control device 13 receives the detection signal 121.

The control device 13 generates the oscillation control signal 131A to control the oscillation of the pulse laser in response to the detection signal 121. The control device 13 transmits the oscillation control signal 131A to the pulse laser oscillator 14A. The pulse laser oscillator 14A receives the oscillation control signal 131A.

The pulse laser oscillator 14A oscillates a pulse laser in response to the oscillation control signal 131A, and irradiates the pulse laser beam 51. The irradiation optical system 18A receives the pulse laser beam 51 from the pulse laser oscillator 14A.

The control device 13 generates an irradiation direction control signal 134A in response to the detection signal 121 to control an irradiation direction of the pulse laser beam 51 and a position where the pulse laser beam 51 is condensed. The control device 13 transmits the irradiation direction control signal 134A to the irradiation optical system 18A. The irradiation optical system 18A receives the irradiation direction control signal 134A.

In response to the irradiation direction control signal 134A, the irradiation optical system 18A adjusts the irradiation direction of the pulse laser beam 51 and adjusts a focal length of the pulse laser beam 51. The irradiation optical system 18A irradiates the pulse laser beam 51 to the adjusted direction to condense in the adjusted focal length. After the second step S102, a third step S103 is executed.

Figure 6B:
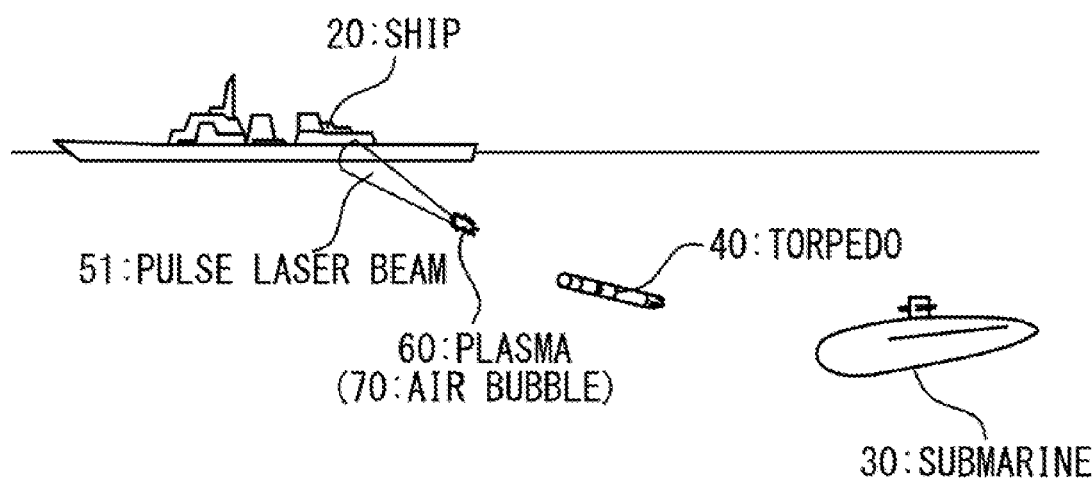
FIG. 6B is a diagram showing an example of state that the underwater object destruction system according to the first embodiment irradiates a laser beam.

At the third step S103, the air bubble 70 or plasma 60 is generated in the underwater by the irradiated laser beam. More specifically, the irradiated pulse laser beam 51 is condensed in the adjusted position. Water around the condensing position boils up by the condensed pulse laser beam 51, and the air bubble 70 is generated. Or, the water around the condensing position is plasmatizes by the condensed pulse laser beam 51 and the plasma 60 is generated. FIG. 6B is a diagram showing an example of state that the underwater object destruction system 1 in the first embodiment irradiates the laser beam. After the third step S103, a fourth step S104 is executed.

Figure 6C:
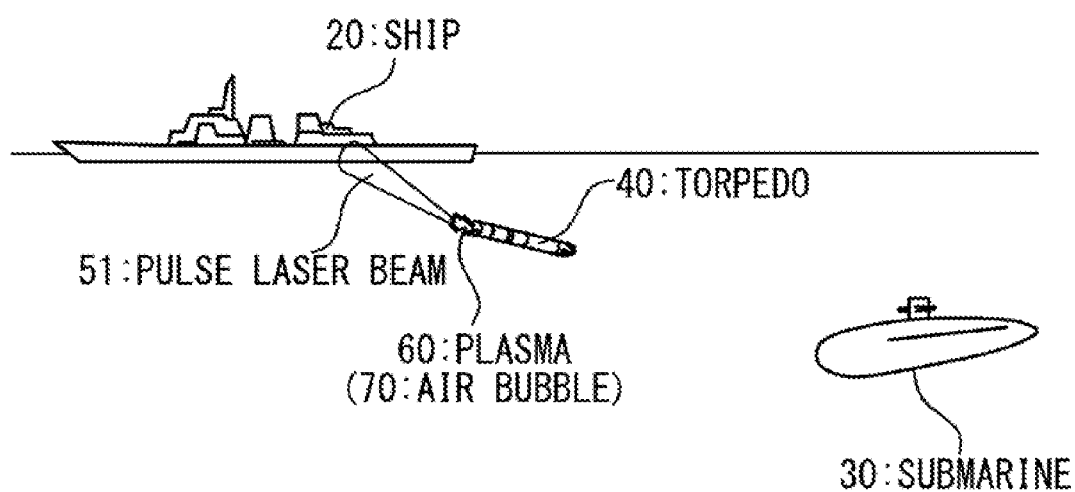
FIG. 6C is a diagram showing an example of state that the target object approaches a close position to plasma or an air bubble generated by the laser beam irradiated from the underwater object destruction system according to the first embodiment.
Figure 6D:
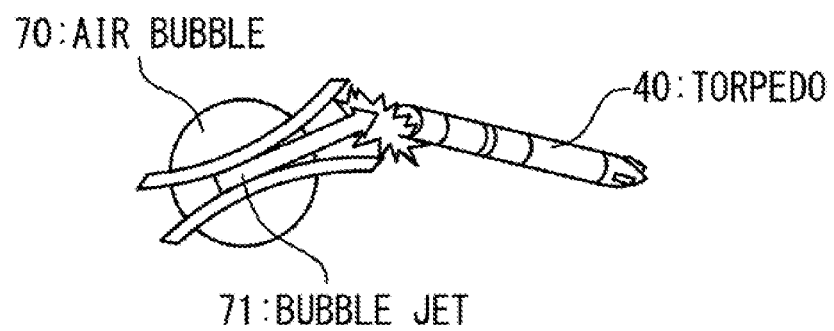
FIG. 6D is a diagram showing an example of state that the underwater object destruction system according to the first embodiment destroys the target object with a shock due to the plasma.
Figure 6E:
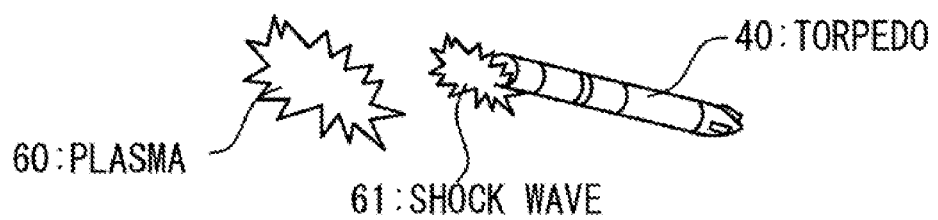
FIG. 6E is a diagram showing an example of state that the underwater object destruction system according to the first embodiment destroys the target object with the bubble jet due to the air bubble.

At the fourth step S104, the target object 40 is destroyed by the shock wave 61 generated due to the bubble jet 71 or plasma 60 generated with the air bubble 70. More specifically, an air bubble 70 is generated in the underwater by the pulse laser beam 51. When there is the target object 40 in the close position to the air bubble 70 or the target object 40 approaches the air bubble 70, the bubble jet 71 is generated which destroys the target object 40. Or, the plasma 60 is generated in the underwater with the pulse laser beam 51. When there is the target object 40 in the close position to the plasma 60 or the target object 40 approaches the plasma 60, the shock wave 61 generated by the plasma 60 destroys the target object 40. FIG. 6C is a diagram showing an example of state that the target object 40 approaches a close position to the plasma 60 or air bubble 70 generated by the underwater object destruction system 1 in the first embodiment by use of the laser beam. FIG. 6D is a diagram showing an example of state that the target object 40 is destroyed with the bubble jet 71 due to the air bubble 70 by the underwater object destruction system 1 in the first embodiment. FIG. 6E is a diagram showing an example of state that the underwater object destruction system 1 in the first embodiment destroys the target object 40 by use of the shock wave 61 due to the plasma 60. After the fourth step S104, a fifth step S105 is executed and the flow chart of FIG. 5 ends.

Figure 7A:
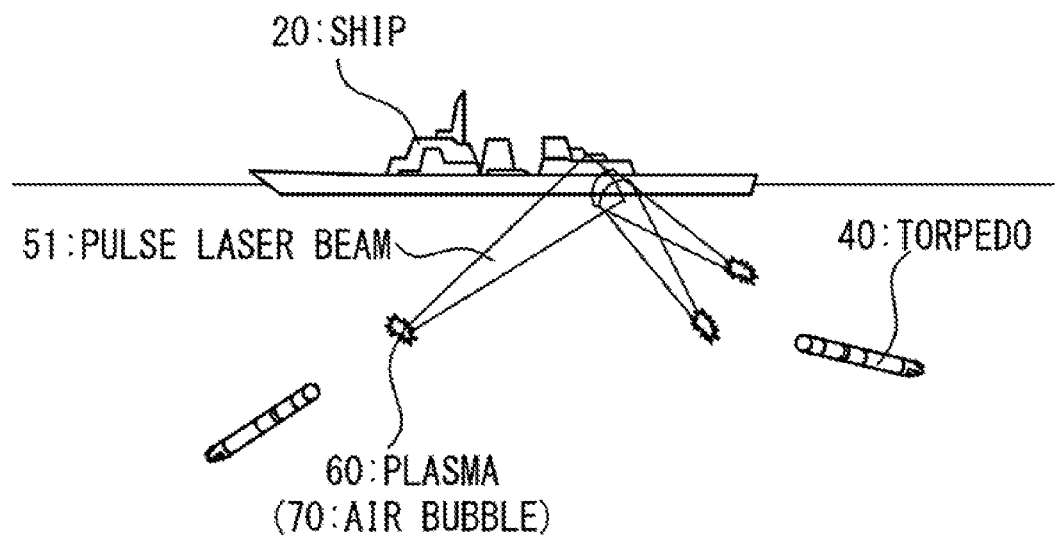
FIG. 7A is a diagram showing an example of state that the underwater object destruction system according to the first embodiment irradiates a plurality of laser beams.

A modification example of the present embodiment will be described from the viewpoint of the condense position of the laser beam. For example, the underwater object destruction system 1 in the present embodiment may include a plurality of pulse laser oscillators 14A. In this case, the underwater object destruction system 1 is possible to irradiate a plurality of pulse laser beams 51 at once and make the pulse laser beams 51 be condensed at different positions to generate a plurality of air bubbles 70 or plasmas 60 at once. Or, the underwater object destruction system 1 is possible to make the pulse laser beam 51 be intermittently irradiated in a short interval from a single pulse laser oscillator 14A and make the laser beam 51 be condensed at different positions to generate a plurality of air bubbles 70 or plasmas 60 continuously. FIG. 7A is a diagram showing an example of state that the underwater object destruction system 1 in the first embodiment irradiate a plurality of laser beams.

Figure 7B:
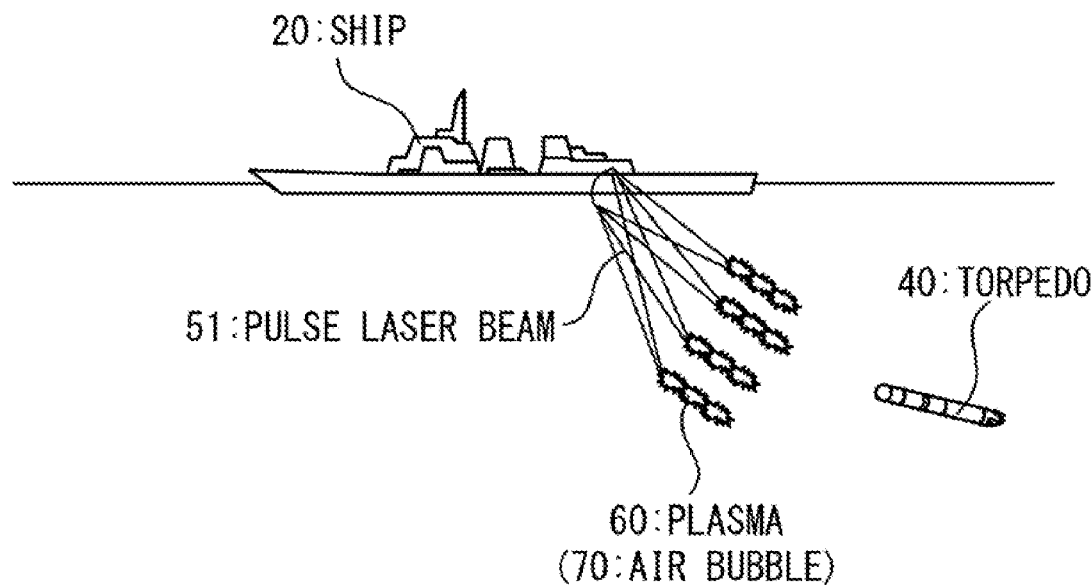
FIG. 7B is a diagram showing an example of state that the underwater object destruction system according to the first embodiment irradiates the plurality of laser beams to generate a plurality of air bubbles or a plurality of plasma.

Another configuration example of the present embodiment will be described. As explained in the above, the underwater object destruction system 1 in the present embodiment is possible to generate and arrange a plurality of air bubbles 70 or a plurality of plasmas 60 like a wall or a network, by irradiating the plurality of pulse laser beams 51 at once or continuously. FIG. 7B is a diagram showing an example of state that the underwater object destruction system 1 in the first embodiment irradiates the plurality of laser beams to generate the plurality of air bubbles 70 or the plurality of plasmas 60. By adjusting the interval between every adjacent two of the plurality of air bubbles 70 or the plurality of plasmas 60 to be sufficiently smaller than the size of the target object 40 such as a torpedo, it becomes possible to destroy the target object 40 by waiting for it precisely.

Figure 8A:
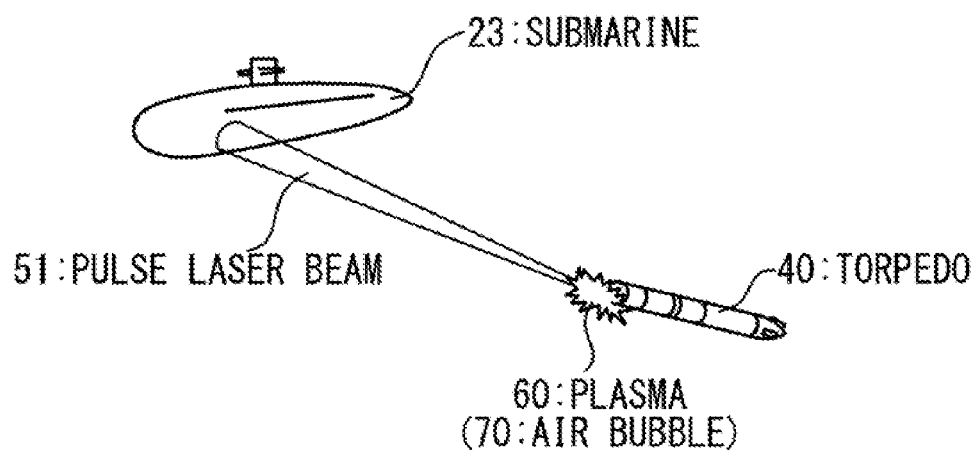
FIG. 8A is a diagram showing a configuration example of a submarine which irradiates a laser beam in underwater in the underwater object destruction system according to the first embodiment.

Another configuration example of the present embodiment will be described from the viewpoint of the irradiation position of the laser beam. For example, the underwater object destruction system 1 in the present embodiment can be loaded into a submarine 23. In this case, the pulse laser beam 51 is irradiated from the underwater. FIG. 8A is a diagram showing a configuration example that the submarine 23 irradiates the laser beam from the underwater, in the underwater object destruction system 1 in the first embodiment.

Figure 8B:
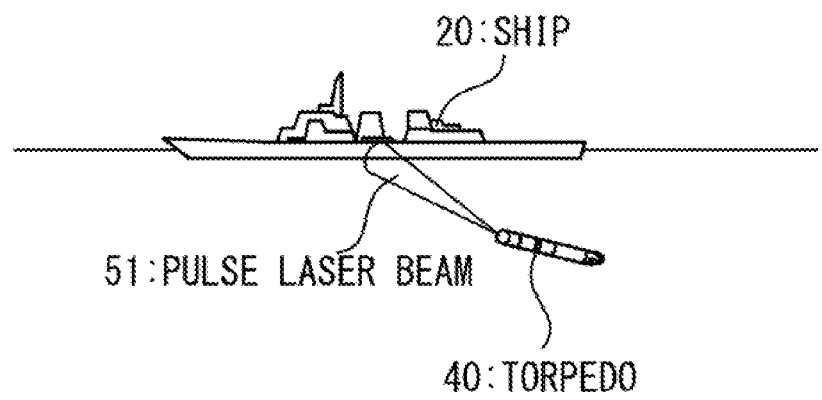
FIG. 8B is a diagram showing a configuration example of a ship which irradiates a laser beam in underwater in the underwater object destruction system according to the first embodiment.
Figure 8C:
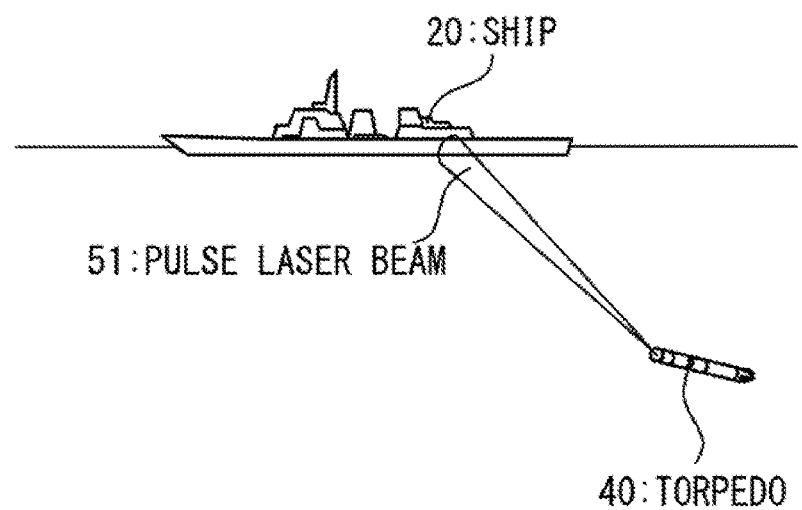
FIG. 8C is a diagram showing a configuration example of the ship which irradiates the laser beam from air in the underwater object destruction system according to the first embodiment.

Another configuration example of the present embodiment will be described. For example, the underwater object destruction system 1 in the present embodiment can be loaded into a ship 20. In this case, the pulse laser beam 51 can be irradiated from the underwater and from the atmosphere. FIG. 8B is a diagram showing a configuration example when the ship 20 irradiates the laser beam from the underwater in the underwater object destruction system 1 according to the first embodiment. FIG. 8C is a diagram showing a configuration example when the ship 20 irradiates the laser beam from the air, in the underwater object destruction system 1 of the first embodiment. Note that as mentioned above, the attenuation of the laser beam is few in case of propagating through the air than a case of propagating through the underwater. Therefore, the pulse laser beam 51 or a continuous-wave laser beam 52 can be condensed in a more distant place when being irradiated from the air.

Figure 8D:
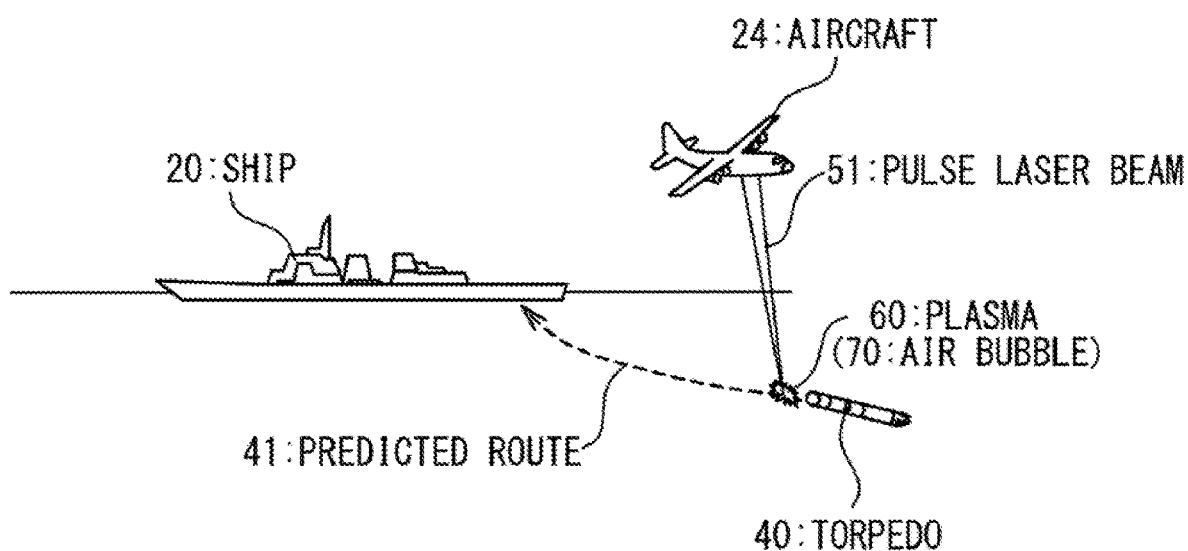
FIG. 8D is a diagram showing a configuration example of an aircraft which irradiates a laser beam from air in the underwater object destruction system according to the first embodiment.

Still another configuration example of the present embodiment will be described. The underwater object destruction system 1 in the present embodiment may be loaded into an aircraft. In this case, the pulse laser beam 51 is irradiated from the air. FIG. 8D is a diagram showing a configuration example when an aircraft 24 irradiates a laser beam from the air, in the underwater object destruction system 1 in the first embodiment. By loading the underwater object destruction system 1 into the aircraft 24, a defensing object can be more surely defended by setting a light-condensing point of the pulse laser beam 51 which is on a prediction moving route 41 of the target object 40 and which is a distant place from the ship 20 as the defensing object to be defended from a torpedo as the target object 40.

As described above, according to the underwater object destruction system 1 and the underwater object destruction method in the present embodiment, the avoidance from a threat is possible by destroying the target object such as the torpedo 40. Note that because an instantaneous output is large in the pulse laser beam, a time lug from the irradiation of the pulse laser beam to the generation of the air bubble 70 or plasma 60 is suppressed in a nanosecond order. Also, because the time average of output is short in the pulse laser beam, the power necessary to destroy the target object can be suppressed small.

Second Embodiment

FIG. 9 is a block circuit diagram showing a configuration example of the underwater object destruction system 1 according to a second embodiment. The underwater object destruction system 1 in the present embodiment shown in FIG. 9 has the following different points from the underwater object destruction system 1 according to the first embodiment shown in FIG. 4. That is, in the present embodiment, the continuous-wave laser beam 52 is used in place of the pulse laser beam 51 used in the first embodiment.

Specifically, the pulse laser oscillator 14A and the irradiation optical system 18A in the first embodiment are replaced by the continuous-wave laser oscillator 14B and the irradiation optical system 18B which are shown in FIG. 9. Because the remaining configuration of the underwater object destruction system 1 in the present embodiment is same as in the first embodiment, further detailed description is omitted.

The continuous-wave laser beam 52 used in the present embodiment is possible to generate the air bubble 70 by condensing in the underwater, like the pulse laser beam 51 in the first embodiment.

Moreover, the continuous-wave laser beam 52 can be irradiated without interruption. Therefore, it is possible to generate the air bubble 70 continuously. Here, by moving a condensing position while generating the laser beam continuously, the continuous-wave laser beam 52 is possible to generate a long air bubble 70.

Figure 10:
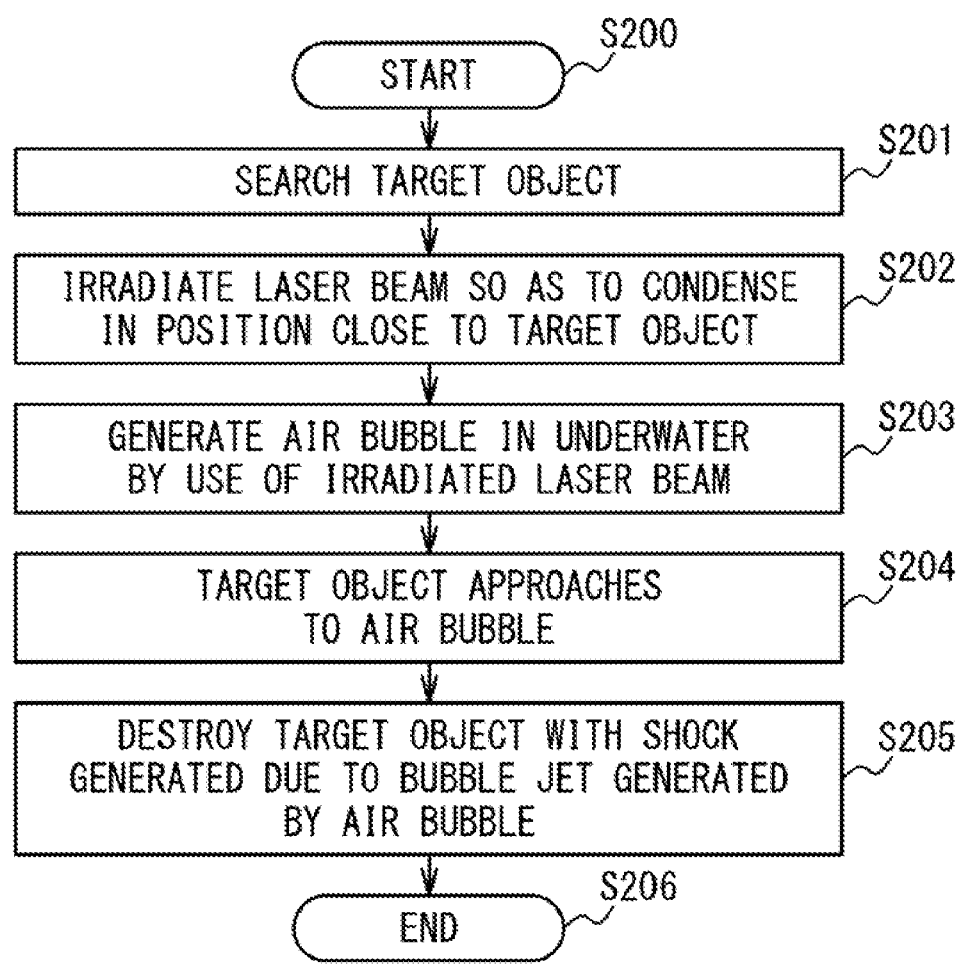
FIG. 10 is a flow chart showing an example of the underwater object destruction method according to the second embodiment.

The operation of each of components in the present embodiment in relation to the continuous-wave laser oscillator 14B and the irradiation optical system 18B will be described. FIG. 10 is a flow chart showing an example of the underwater object destruction method in the second embodiment. The flow chart shown in FIG. 10 contains 7 steps from a $0^{th}$ step S200 to a sixth step S206. The flow chart of FIG. 10 begins from the $0^{th}$ step S200. After the $0^{th}$ step S200, a first step S201 is executed.

At the first step S201, the underwater object destruction system 1 detects the target object 40. Since the first step S201 in the present embodiment is same as the first step S101 in the first embodiment, further detailed description is omitted. After the first step S201, a second step S202 is executed.

At the second step S202, the underwater object destruction system 1 irradiates the laser beam to a target position determined in relation to the target object 40 so as to be condensed. More specifically, the external system 12 generates the detection signal 121 showing a detection result of the target object 40. The external system 12 transmits the detection signal 121 to the control device 13. The control device 13 receives the detection signal 121.

The control device 13 generates an oscillation control signal 131B in response to the detection signal 121 to control the oscillation of continuous-wave laser beam 52. The control device 13 transmits the oscillation control signal 131B to the continuous-wave laser oscillator 14B. The continuous-wave laser oscillator 14B receives the oscillation control signal 131B.

The continuous-wave laser oscillator 14B oscillates the continuous-wave laser beam 52 in response to the oscillation control signal 131B. The continuous-wave laser oscillator 14B outputs the continuous-wave laser beam 52 to the irradiation optical system 18B. The irradiation optical system 18B receives the continuous-wave laser beam 52.

The control device 13 generates an irradiation direction control signal 134B in response to the detection signal 121 to control the irradiation direction of the continuous-wave laser beam 52 and to control the condensing position of the continuous-wave laser beam 52. The control device 13 transmits the irradiation direction control signal 134B to the irradiation optical system 18B. The irradiation optical system 18B receives the irradiation directional control signal 134B.

The irradiation optical system 18B adjusts an irradiation direction of the continuous-wave laser beam 52 and a focal length of the continuous-wave laser beam 52 in response to the irradiation directional control signal 134B. The irradiation optical system 18B irradiates the continuous-wave laser beam 52 to an adjusted direction and to be condensed in the adjusted focal length. After the second step S202, a third step S203 is executed.

Figure 11A:
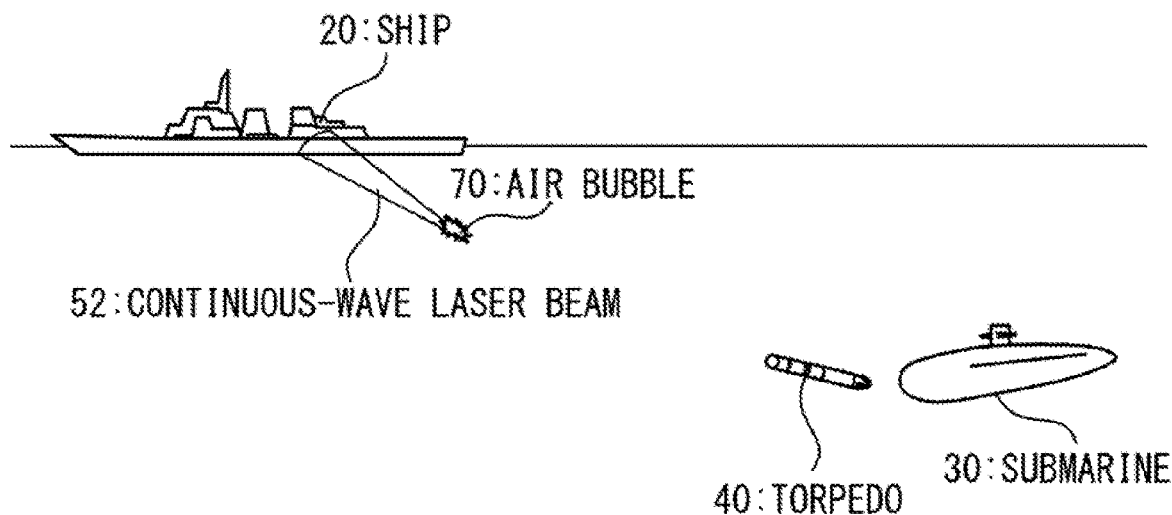
FIG. 11A is a diagram showing a state that the underwater object destruction system according to the second embodiment irradiates a continuous-wave laser beam.

At the third step S203, the air bubble 70 is generated in the underwater through the irradiation of the continuous-wave laser beam 52. More specifically, the irradiated continuous-wave laser beam 52 is condensed in the adjusted position. The water around the condensing position boils up by the condensed continuous-wave laser beam 52 so as to generate the air bubble 70. Here, the continuous-wave laser beam 52 continues to be continuously irradiated and the air bubble 70 continues to be continuously generated. FIG. 11A is a diagram showing an example of state that the underwater object destruction system 1 in the second embodiment irradiates the continuous-wave laser beam 52. After the third step S203, a fourth step S204 is executed.

Figure 11B:
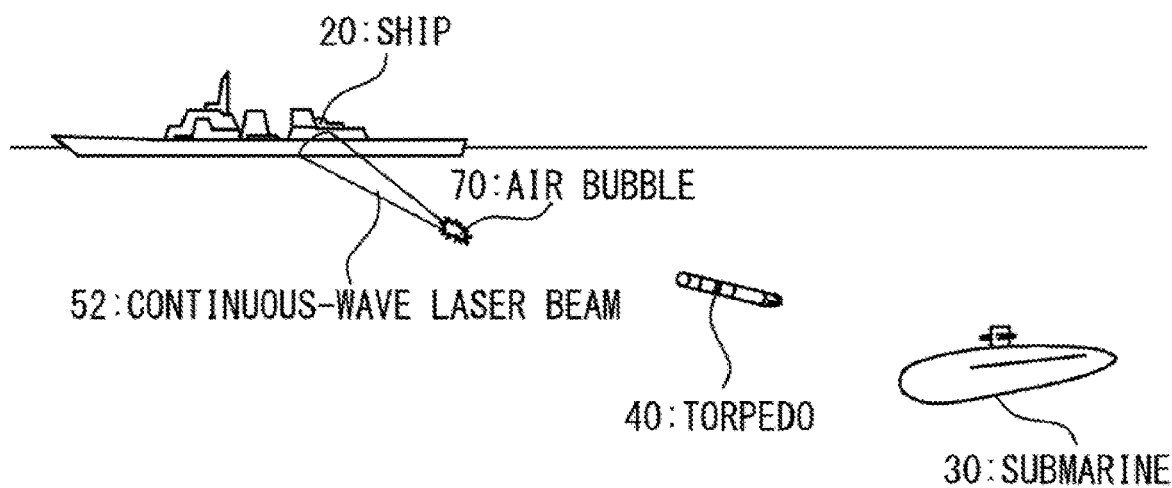
FIG. 11B is a diagram showing a state that the target object approaches while the underwater object destruction system according to the second embodiment continues to irradiate the continuous-wave laser beam.

At the fourth step S204, the target object 40 approaches the air bubble 70. FIG. 11B is a diagram showing a state that the target object 40 approaches while the underwater object destruction system 1 in the second embodiment continues to irradiate the continuous-wave laser beam 52. After the fourth step S204, a fifth step S205 is executed.

Figure 11C:
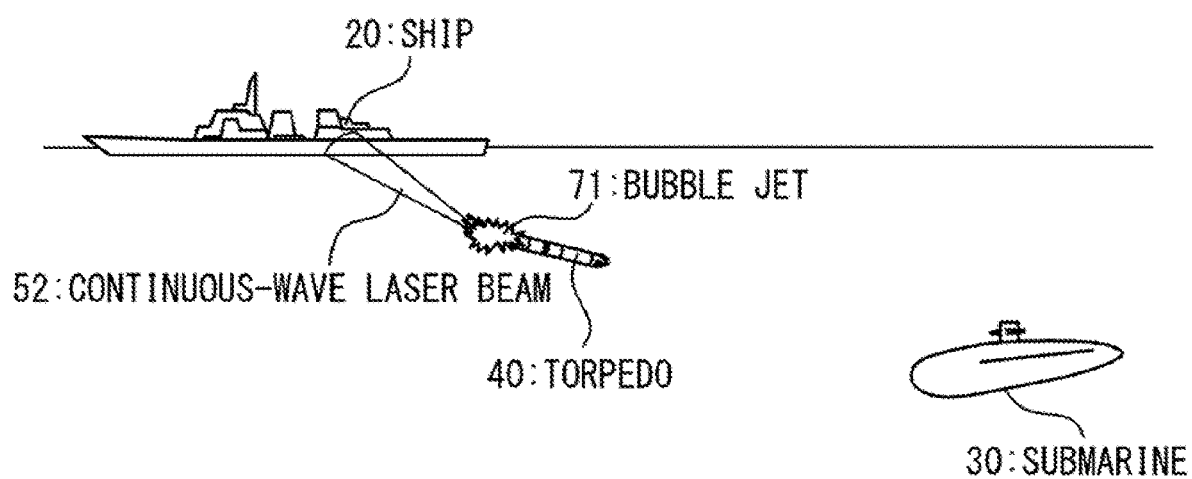
FIG. 11C is a diagram showing a state that the target object is destroyed with an air bubble generated by the continuous-wave laser beam continuously irradiated from the underwater object destruction system according to the second embodiment.

At the fifth step S205, the target object 40 is destroyed with the bubble jet 71 generated due to the air bubble 70. More specifically, the air bubble 70 is generated in the underwater by the continuous-wave laser beam 52. When the target object 40 approaches the air bubble 70, the bubble jet 71 is generated and the bubble jet 71 destroys the target object 40. FIG. 11C is a diagram showing an example of state that the target object 40 is destroyed by the air bubble 70 generated by the continuous-wave laser beam 52 when the underwater object destruction system 1 in the second embodiment irradiates continuously. The sixth step S206 is executed after the fifth step S205 and the flow chart of FIG. 10 ends.

A plurality of air bubbles 70 can be generated with the continuous-wave laser beam 52 by continuously irradiating while changes the condensing position. This configuration example is same as in the first embodiment shown in FIG. 7A. Therefore, further detailed description is omitted.

Moreover, by irradiating the continuous-wave laser beam 52 so that the air bubbles 70 are arranged in a constant interval, it is possible to precisely await the target object 40. This configuration example is same as in the first embodiment shown in FIG. 7B. Therefore, further detailed description is omitted.

The continuous-wave laser oscillator 14B and the irradiation optical system 18B may be loaded into the submarine 23, the ship 20, the aircraft 24 and so on, like the first embodiment shown in FIG. 8A to FIG. 8D. Also, in these cases, the continuous-wave laser beam 52 can be irradiated from the underwater or the air.

Generally, the continuous-wave laser beam 52 is lower in an instantaneous output than the pulse laser beam 51. Therefore, a time lug from the irradiation to the generation of the air bubble 70 is caused in an order of tens of milliseconds to hundreds of milliseconds. On the other hand, since it is possible to continuously generate the air bubbles 70, the destruction of the target object 40 can be realized in a higher probability, even when the moving direction of the target object 40 such as the torpedo can be precisely detected but the moving velocity cannot be precisely detected.

Third Embodiment

In the third embodiment, the merit of the first embodiment and that of the second embodiment are both established by using the pulse laser beam 51 used in the first embodiment and the continuous-wave laser beam 52 used in the second embodiment. Here, the pulse laser beam 51 and the continuous-wave laser beam 52 may be irradiated by a switching operation and may be both irradiated at the same time.

(First configuration example of third embodiment)

When the pulse laser beam 51 and the continuous-wave laser beam 52 are alternately irradiated, the pulse laser beam 51 and the continuous-wave laser beam 52 may be oscillated from different oscillators and irradiated from different irradiation optical systems, respectively, as a first configuration example of the underwater object destruction system 1 in the present embodiment. FIG. 12A is a block circuit diagram showing the first configuration example of the underwater object destruction system 1 in a third embodiment. The underwater object destruction system 1 shown in FIG. 12A includes the control device 13, the pulse laser oscillator 14A, the continuous-wave laser oscillator 14B, the irradiation optical system 18A for pulse laser, and the irradiation optical system 18B for continuous-wave laser.

The first configuration example of the third embodiment shown in FIG. 12A is different in the following points from the first embodiment shown in FIG. 4. That is, the continuous-wave laser oscillator 14B and the irradiation optical system 18B for the continuous-wave laser beam are added. Also, the first configuration example of the third embodiment shown in FIG. 12A is different in the following points from the second embodiment shown in FIG. 9. That is, the pulse laser oscillator 14A and the irradiation optical system 18A for the pulse laser beam are added.

The configuration and connection relation of the control device 13, the pulse laser oscillator 14A and the irradiation optical system 18A for the pulse laser beam are same as those of the first embodiment. Therefore, further detailed description is omitted.

The configuration and connection relation of the control device 13, the continuous-wave laser oscillator 14B and the irradiation optical system 18B for the continuous-wave laser beam are same as those of the second embodiment. Therefore, further detailed description is omitted. It is desirable that the control device 13 generates and outputs the oscillation control signal 131A to control the oscillation of pulse laser beam 51 and the oscillation control signal 131B to control the oscillation of continuous-wave laser beam 52 in response to the detection signal 121 received from the external system (not shown) at an appropriate timing. The other operation of the underwater object destruction system 1 according to the first configuration example of the present embodiment is same as that of the first embodiment or the second embodiment. Therefore, further detailed description is omitted.

(Second configuration example of third embodiment)

Figure 12B:
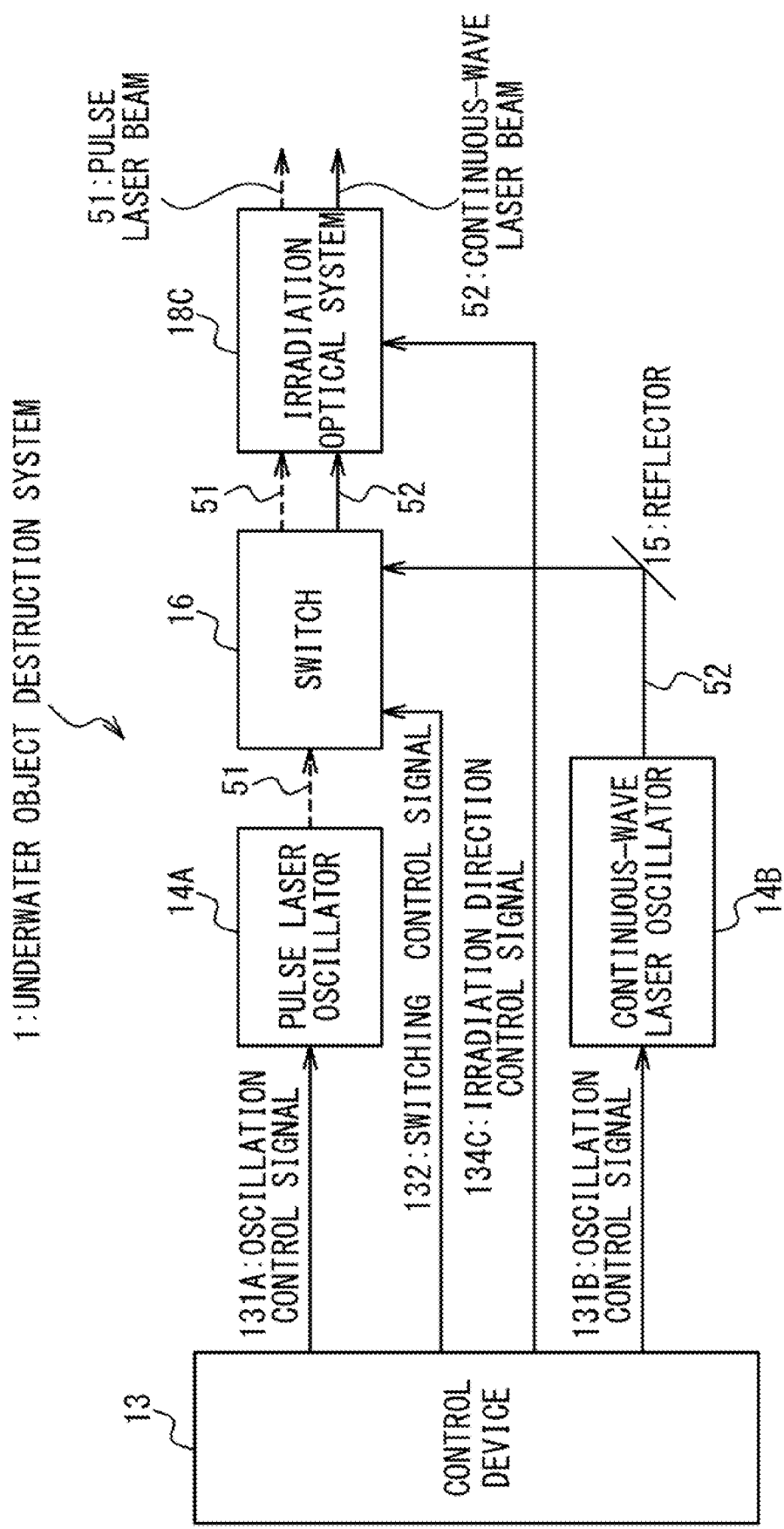
FIG. 12B is a block circuit diagram showing a second configuration example of the underwater object destruction system according to the third embodiment.

When the pulse laser beam 51 and the continuous-wave laser beam 52 are alternately irradiated, the pulse laser beam 51 and the continuous-wave laser beam 52 may be oscillated from the different oscillators, coaxialized by use of an auxiliary optical system and so on, and then irradiated from a common irradiation optical system, as a second configuration example of the underwater object destruction system 1 in the present embodiment. FIG. 12B is a block circuit diagram showing the second configuration example of the underwater object destruction system 1 in the third embodiment. The underwater object destruction system 1 shown in FIG. 12B includes the control device 13, the pulse laser oscillator 14A, the continuous-wave laser oscillator 14B, and a reflector 15 as an auxiliary optical system, a switching device 16 and an irradiation optical system 18C. The underwater object destruction system 1 shown in FIG. 12B is different in the following points from the first embodiment shown in FIG. 4. That is, the continuous-wave laser oscillator 14B and the switching device 16 are added. The switching device 16 includes two light reception ports, one light emitting port, and a reflector different from the reflector 15, and a drive unit to adjust the position or angle of this reflector.

The configuration and connection relation of the control device 13 and the pulse laser oscillator 14A are same as in the first embodiment. Therefore, further detailed description is omitted. The configuration and connection relation of the control device 13 and the continuous-wave laser oscillator 14B are same as in the second embodiment. Therefore, further detailed description is omitted.

When paying attention to an electric connection relation of the other connection relation of components shown in FIG. 12B, the switching device 16 and an irradiation optical system 18C are connected with the control device 13. Also, when paying attention to an optical connection relation, the switching device 16 is arranged in the subsequent stage of the pulse laser oscillator 14A, and the irradiation optical system 18C is arranged in the subsequent stage of the switching device 16.

Moreover, the switching device 16 is arranged in the subsequent stage of the continuous-wave laser oscillator 14B through the reflector 15. Note that the reflector 15 may be arranged between the pulse laser oscillator 14A and the switching device 16.

The operation of the reflector 15, the switching device 16 and the irradiation optical system 18C of the components of the second configuration example in the third embodiment will be described.

A series of operations from the generation of the oscillation control signal 131A by the control device 13 to the oscillation of the pulse laser beam 51 by the pulse laser oscillator 14A are same as those of the first embodiment. Also, a series of operations from the generation of the oscillation control signal 131B by the control device 13 to the oscillation of the continuous-wave laser beam 52 by the continuous-wave laser oscillator 14B are same as those of the second embodiment. The switching device 16 receives the pulse laser beam 51 in the first light reception port and receives the continuous-wave laser beam 52 in the second light reception port through the reflector 15. Here, the reflector 15 leads the continuous-wave laser beam 52 to the second light reception port of the switching device 16 from the emitting port of the continuous-wave laser oscillator 14B.

The control device 13 generates a switching control signal 132 to control the switching operation of the pulse laser beam 51 and the continuous-wave laser beam 52. The control device 13 transmits the switching control signal 132 to the switching device 16. The switching device 16 receives the switching control signal 132. The switching device 16 adjusts the position and angle of the reflector by the drive unit in response to the switching control signal 132. Thus, the switching device 16 can switch a first state and a second state under the control of the control device 13. That is, the switching device 16 in the first state selectively emits the pulse laser beam 51 received in the first light reception port from the emitting port. Also, the switching device 16 in the second state selectively emits the continuous-wave laser beam 52 received in the second light reception port from the emitting port. The irradiation optical system 18C receives the pulse laser beam 51 or the continuous-wave laser beam 52 which has been emitted selectively.

The control device 13 generates an irradiation direction control signal 134C to control the irradiation direction of a laser beam by the irradiation optical system 18C and to control the condensing position of the laser beam. The control device 13 transmits an irradiation direction control signal 134C to an irradiation optical system 18C. The irradiation optical system 18C receives the irradiation direction control signal 134C. The irradiation optical system 18C adjusts the irradiation direction and the focal length in response to the irradiation directional control signal 134C. The irradiation optical system 18C irradiates the pulse laser beam 51 or the continuous-wave laser beam 52 in the adjusted irradiation direction so as to be condensed in the adjusted focal length.

Desirably, the control device 13 generates and outputs the oscillation control signal 131A, the oscillation control signal 131B, and the switching control signal 132 at appropriate timings in response to the detection signal 121 received from the external system 12 (not shown). The other operations of the underwater object destruction system 1 in the second configuration example of the present embodiment are same as those of the first embodiment and the second embodiment. Therefore, further detailed description is omitted.

(Third configuration example of third embodiment)

When the pulse laser beam 51 and the continuous-wave laser beam 52 are alternately irradiated, the pulse laser beam 51 and the continuous-wave laser beam 52 may be output from the identical oscillator and moreover irradiated from the identical irradiation optical system, in the third configuration example of the underwater object destruction system 1 in the present embodiment. FIG. 12C is a block circuit diagram showing the third configuration example of the underwater object destruction system 1 in the third embodiment. The underwater object destruction system 1 shown in FIG. 12C includes the control device 13, a pulse/continuous-wave switching laser oscillator 14C and the irradiation optical system 18C.

The pulse/continuous-wave switching laser oscillator 14C is switched between the first state and the second state under the control of the control device 13. That is, the pulse/continuous-wave switching laser oscillator 14C outputs the pulse laser beam 51 in the first state and outputs the continuous-wave laser beam 52 in the second state.

More specifically, pulsed devices such as so-called "Q switch" and a method of using it are thought of. That is, the pulsed device is optically connected to the pulse/continuous-wave switching laser oscillator 14C in the first state to oscillate the pulse laser beam 51. The pulsed device is optically removed and the pulse/continuous-wave switching laser oscillator 14C in the second state oscillates the continuous-wave laser beam 52.

The connection relation of components shown in FIG. 12C will be described. When paying attention to the electric connection relation, the pulse/continuous-wave switching laser oscillator 14C and the irradiation optical system 18C are connected with the control device 13. Also, when paying attention to the optical connection relation, the irradiation optical system 18C is arranged in the subsequent stage of the pulse/continuous-wave switching laser oscillator 14C.

The operation of the underwater object destruction system 1 shown in FIG. 12C will be described. The control device 13 generates an oscillations control signal 131C to control the oscillation of the pulse laser beam 51 and the continuous-wave laser beam 52 and the switching between them. The control device 13 transmits the oscillation control signal 131C to the pulse/continuous-wave switching laser oscillator 14C. The pulse/continuous-wave switching laser oscillator 14C receives the oscillation control signal 131C. The pulse/continuous-wave switching laser oscillator 14C selectively oscillates the pulse laser beam 51 or the continuous-wave laser beam 52 in response to the oscillation control signal 131C. The pulse/continuous-wave switching laser oscillator 14C outputs the pulse laser beam 51 or the continuous-wave laser beam 52 to the irradiation optical system 18C.

The operation from the generation of the irradiation direction control signal 134C by the control device 13 to the irradiation of the pulse laser beam 51 or the continuous-wave laser beam 52 from the irradiation optical system 18C is same as that of the second configuration example of the third embodiment shown in FIG. 12B. Therefore, further detailed description is omitted.

(Fourth configuration example of third embodiment)

When irradiating the pulse laser beam 51 and the continuous-wave laser beam 52 at the same time, the pulse laser beam 51 and the continuous-wave laser beam 52 may be oscillated from the different oscillators and irradiated from the different irradiation optical systems, respectively, as the fourth configuration example of the underwater object destruction system 1 in the present embodiment. The block circuit diagram showing the fourth configuration example of the underwater object destruction system 1 in the third embodiment is identical to FIG. 12A showing the first configuration example in the third embodiment. Therefore, the further description thereof is omitted. However, different from the case of the first configuration example, the underwater object destruction system 1 of this configuration example can irradiate the pulse laser beam 51 and the continuous-wave laser beam 52 at the same time. Therefore, in this configuration example, the control device 13 may transmit the oscillation control signal 131A and the oscillation control signal 131B to the pulse laser oscillator 14A and the continuous-wave laser oscillator 14B at the same time, respectively.

The remaining configuration and operation of the underwater object destruction system 1 in this configuration example are same as those of the first embodiment or the second embodiment. Therefore, further detailed description is omitted.

(Fifth configuration example of third embodiment)

When irradiating the pulse laser beam 51 and the continuous-wave laser beam 52 at the same time, the pulse laser beam 51 and the continuous-wave laser beam 52 may be oscillate from the different oscillators and irradiated from the identical irradiation optical system, as the fifth configuration example of the underwater object destruction system 1 in the present embodiment. FIG. 12D is a block circuit diagram showing the fifth configuration example of the underwater object destruction system 1 in the third embodiment. The underwater object destruction system 1 shown in FIG. 12D is different from the second configuration example of the present embodiment shown in FIG. 12B in the following points. That is, the switching device 16 is replaced with a coaxialization device 17. It is desirable that the coaxialization device 17 has two light reception ports and one emitting port. The coaxialization device 17 coaxializes two laser beams received in two light reception ports and irradiates from the emitting port.

The configuration and connection relation of the control device 13 and the pulse laser oscillator 14A is same as those of the first embodiment. Therefore, further detailed description is omitted. The configuration and connection relation of the control device 13 and the continuous-wave laser oscillator 14B are same as those of the second embodiment. Therefore, further detailed description is omitted.

The connection relation of components in the coaxialization device 17 will be described. When paying attention to the electric connection relation, the coaxialization device 17 is connected with the control device 13. Also, when pay attention to the optical connection relation, the first light reception port of the coaxialization device 17 is arranged in the subsequent stage of the pulse laser oscillator 14A. The second light reception port of the coaxialization device 17 is arranged through the reflector 15 in the subsequent stage of the continuous-wave laser oscillator 14B. The irradiation optical system 18C is arranged in the subsequent stage of the ecoaxialization device 17.

The operation of components of the fifth configuration example of the third embodiment in relation to the coaxialization device 17 will be described.

A series of operations from the generation of the oscillation control signal 131A by the control device 13 to the oscillation of the pulse laser beam 51 by the pulse laser oscillator 14A are same as those of the first embodiment. The pulse laser oscillator 14A emits the pulse laser beam 51 for the first light reception port of the coaxialization device 17. The coaxialization device 17 receives the pulse laser beam 51 in the first light reception port.

A series of operations from the generation of the oscillation control signal 131B by the control device 13 to the oscillation of the continuous-wave laser beam 52 by the continuous-wave laser oscillator 14B are same as those of the second embodiment. Therefore, the continuous-wave laser oscillator 14B emits the continuous-wave laser beam 52 for the second light reception port of the coaxialization device 17.

The control device 13 generates a coaxialization control signal 133 to control the coaxialization of the pulse laser beam 51 and the continuous-wave laser beam 52. The control device 13 transmits the coaxialization control signal 133 to the coaxialization device 17. The coaxialization device 17 receives the coaxialization control signal 133. The coaxialization device 17 adjusts the direction of optical axis of the first light reception port which receives the pulse laser beam 51, the direction of optical axis of the second light reception port which receives the continuous-wave laser beam 52, and the direction of optical axis of the emitting port from which the coaxialized pulse laser beam 51 and continuous-wave laser beam 52 are emitted, in response to the coaxialization control signal 133. The coaxialization device 17 receives the pulse laser beam 51 in the first light reception port in which the direction of optical axis has been adjusted. The coaxialization device 17 receives the continuous-wave laser beam 52 in the second light reception port in which the direction of optical axis has been adjusted. The coaxialization device 17 coaxializes the pulse laser beam 51 and the continuous-wave laser beam 52 to irradiate from the emitting port in which the direction of optical axis.

The control device 13 generates and outputs the oscillation control signal 131A, the oscillation control signal 131B and the coaxialization control signal 133 in response to the detection signal 121 received from the external system 12 (not shown). The other operations of the underwater object destruction system 1 in the fifth configuration example of the third embodiment are same as those of the first embodiment or the second embodiment. Therefore, further detailed description is omitted.

As described above, the underwater object destruction system 1 and the underwater object destruction method in the third embodiment makes it possible to establish the advantages of both of the first embodiment and the second embodiment, by irradiating the pulse laser beam 51 and the continuous-wave laser beam 52 through switching or at the same time.

Fourth Embodiment

In a fourth embodiment, a feedback control is applied to the first to third embodiments. That is, a sound showing the generation of the air bubble 70 or plasma 60 through the irradiation of the laser beam, and a silent state showing failure of the sound generation oppositely are observed by an observation device such as a sonar, and the observation result is fed back so as to adjust an irradiation optical system.

Figure 13:
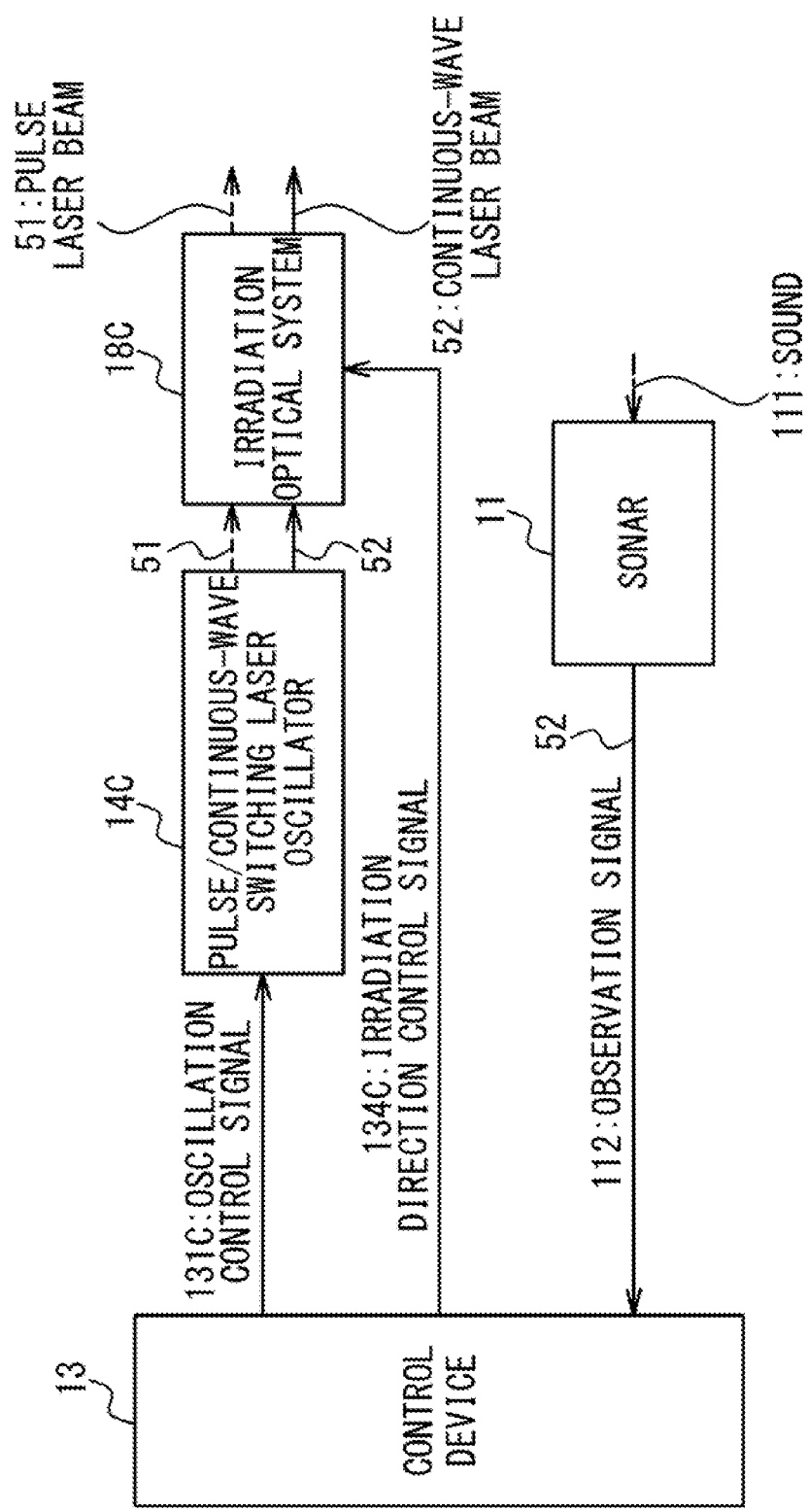
FIG. 13 is a block circuit diagram showing a configuration example of the underwater object destruction system according to a fourth embodiment.

FIG. 13 is a block circuit diagram showing a configuration example of the underwater object destruction system 1 in the fourth embodiment. In the underwater object destruction system 1 shown in FIG. 13 as an example, sonar 11 is added to the third configuration example of the third embodiment shown in FIG. 12C. The sonar 11 is electrically connected with the control device 13. Note that this sonar 11 may be a part of the external system 12 (not shown).

Figure 14:
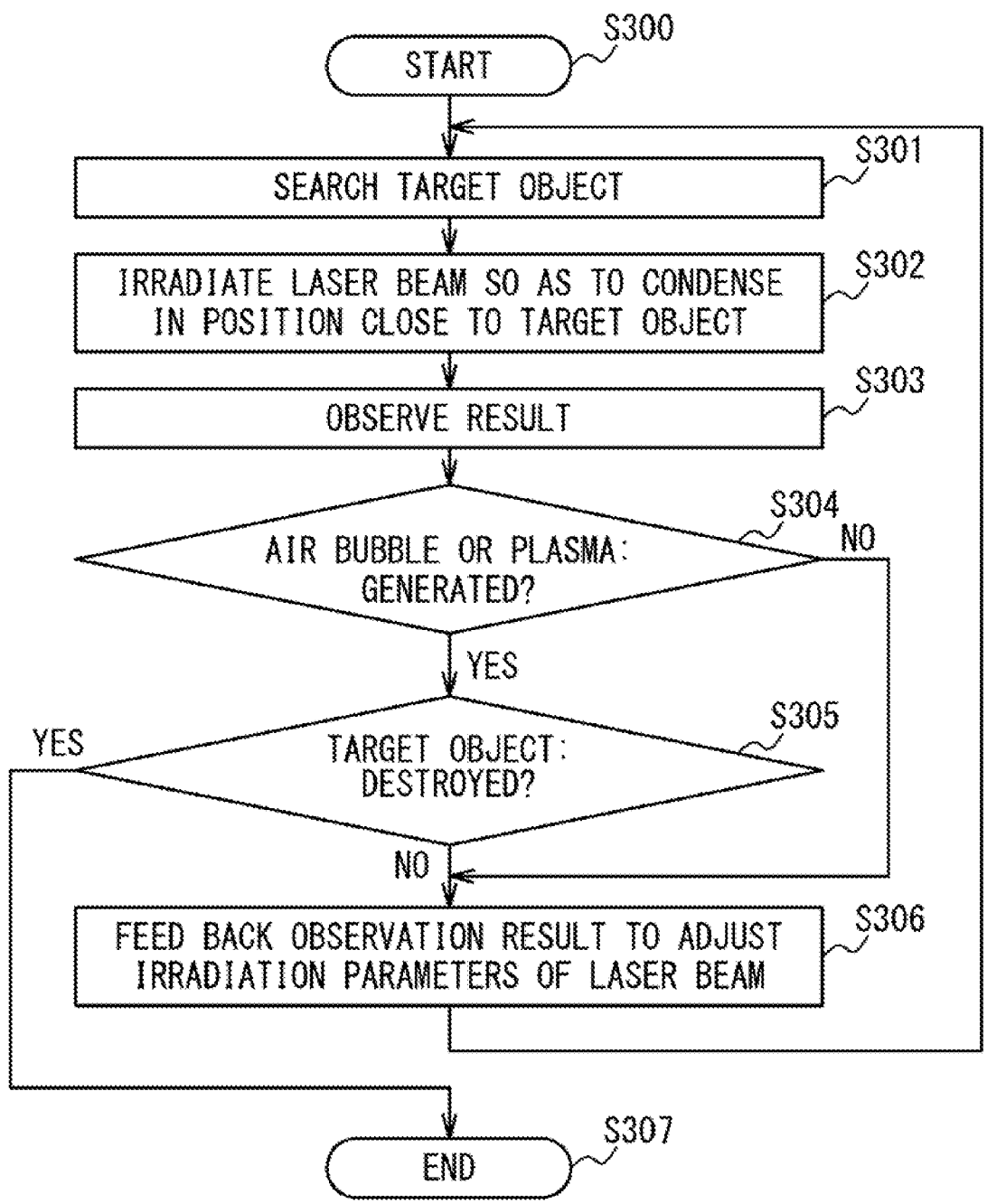
FIG. 14 is a flow chart showing an example of the underwater object destruction method according to the fourth embodiment.

The operation of the underwater object destruction system 1 in the present embodiment, i.e. the operation of the underwater object destruction method in the present embodiment will be described. FIG. 14 is a flow chart showing an example of the underwater object destruction method in the fourth embodiment. The flow chart of FIG. 14 contains 8 steps from a $0^{th}$ step S300 to a seventh step S307. The flow chart of FIG. 14 begins from the $0^{th}$ step S300. After the $0^{th}$ step S300, a first step S301 is executed.

At the first step S301, the underwater object destruction system 1 detects the target object 40. The first step S301 in the present embodiment is same as the first step S101 in the first embodiment. Therefore, further detailed description is omitted. After the first step S301, a second step S302 is executed.

Figure 15A:
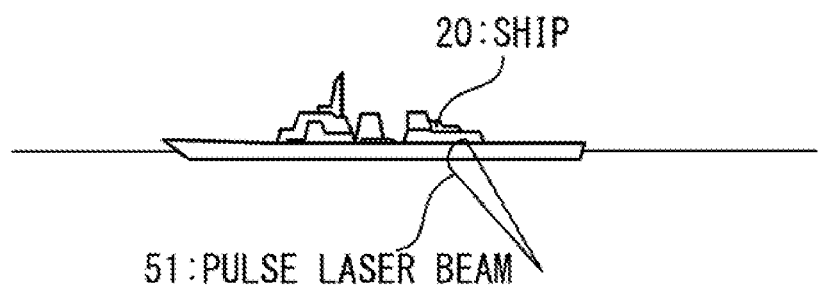
FIG. 15A is a diagram showing an example of state that the underwater object destruction system according to the fourth embodiment irradiates a laser beam.

At the second step S302, the underwater object destruction system 1 irradiates the pulse laser beam 51 or the continuous-wave laser beam 52 so as to be condensed in a target position determined in relation to the target object 40. This operation is same as that of the third configuration example of the third embodiment. Therefore, further detailed description is omitted. FIG. 15A is a diagram showing an example of state that the underwater object destruction system 1 in the fourth embodiment irradiates the laser beam. After the second step S302, a third step S303 is executed.

At the third step S303, the underwater object destruction system 1 observes the result, that is, observes a sound in the periphery by the sonar 11 to determine whether the air bubble 70 or plasma 60 has been generated through the irradiation of the laser beam and whether the target object 40 has been destroyed when the air bubble 70 or plasma 60 has been generated. The sonar 11 electrically converts the observed sound 111 to generate an observation signal 112 and transmits the observation signal 112 to the control device 13. The control device 13 receives the observation signal 112 and carries out the above-mentioned determination. After the third step S303, a fourth step S304 is executed.

Figure 15B:
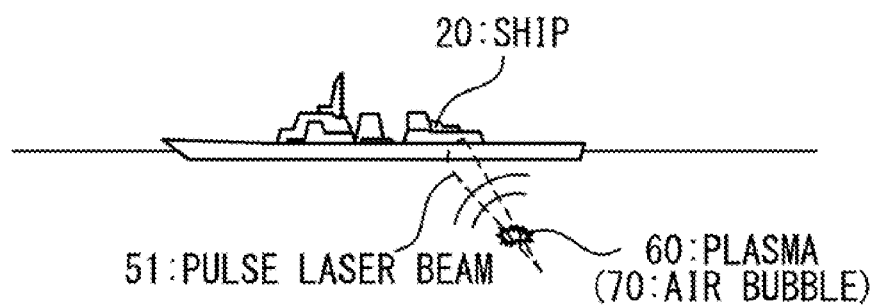
FIG. 15B is a diagram showing an example of state that the laser beam irradiated from the underwater object destruction system according to the fourth embodiment is condensed in a shorter distance than an assumed distance.
Figure 15C:
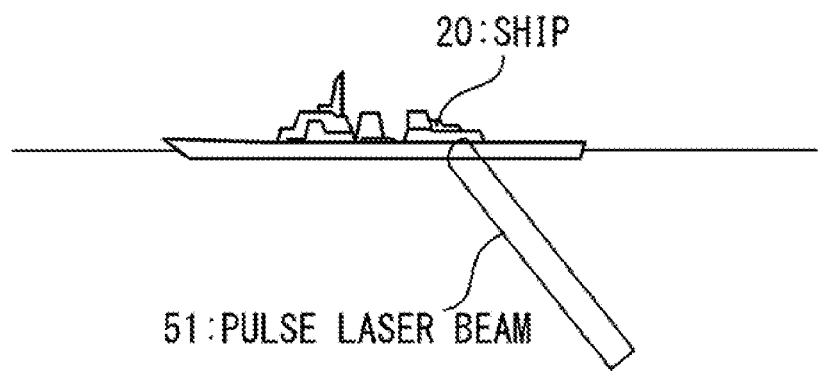
FIG. 15C is a diagram showing an example of state that the underwater object destruction system according to the fourth embodiment has detected that an irradiated laser beam was not condensed so that a shock wave was not generated.

At the fourth step S304, the underwater object destruction system 1 determines whether the air bubble 70 or plasma 60 has been generated. FIG. 15B is a diagram showing an example of state that the laser beam irradiated from the underwater object destruction system 1 in the fourth embodiment has been condensed in a closer distance to the expected position. For example, a case is assumed where the pulse laser beam 51 is irradiated after an irradiation condition and a condensing condition are adjusted such that the laser beam is condensed at a position 100 meters from the irradiation optical system 18C, and as a result, it is detected through the observation of the shock wave by the sonar 11 that the laser beam is actually condensed at a position 90 meters from the irradiation optical system 18C. In this way, when the air bubble 70 or plasma 60 is generated (YES), a fifth step S305 is executed after the fourth step S304. Oppositely, when the laser beam attenuates before being condensed, that is, when the laser beam fails to generate the air bubble 70 or plasma 60, there is no sound to each the sonar 11. FIG. 15C is a diagram showing an example of state when it is detected that the laser beam irradiated from the underwater object destruction system 1 in the fourth embodiment is not condensed so that the shock wave is not generated. For example, it is assumed that the pulse laser beam 51 is irradiated after an irradiation condition is adjusted to be condensed 100 meters from the irradiation optical system 18C but the shock wave cannot be observed by the sonar 11 in a constant time. As a cause of such a failure, it could be considered that the attenuation during propagation of the laser beam is larger than prediction so that the enough energy does not reach the light condensing position or that the laser beam could not be condensed sufficiently by the influence of tide and so on. When the air bubble 70 or plasma 60 is not generated (NO), a sixth step S306 is executed after the fourth step S304.

At the fifth step S305, the underwater object destruction system 1 determines whether or not the target object 40 has been destroyed. When the target object 40 has been destroyed, a sound showing such a state is generated. Therefore, the sonar 11 can detect this sound. In such a case (YES), a seventh step S307 is executed after the fifth step S305, and the flow chart of FIG. 14 ends. Oppositely, there is a case where the air bubble 70 or plasma 60 was generated but the the sound showing destruction of the target object 40 could not be observed. In such a case, as shown in FIG. 15B, it is considered that the laser beam has been condensed in a different position. In this case (NO), the sixth step S306 is executed after the fifth step S305.

Figure 15D:
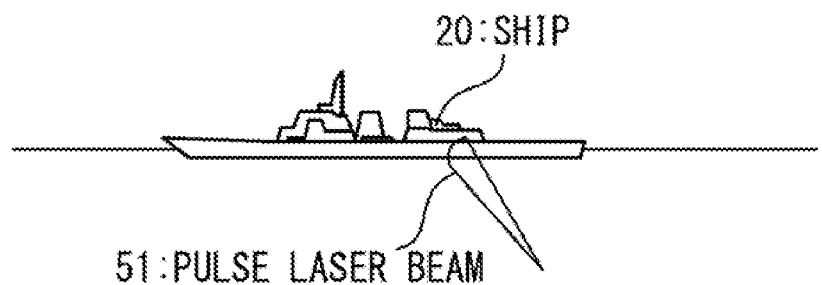
FIG. 15D is a diagram showing an example of state that the underwater object destruction system according to the fourth embodiment irradiates a laser beam once again by a feedback control.

At the sixth step S306, the underwater object destruction system 1 feeds back the observation result and re-adjusts the irradiation condition of the laser beam. The irradiation condition adjusted in this case may contain the selection of pulse laser beam 51 or continuous-wave laser beam 52, the output power of the laser beam, the irradiation direction of the laser beam, the condensing position of the laser beam and so on. After the sixth step S306, the first step S301 is executed. FIG. 15D is a diagram showing an example of state that the underwater object destruction system 1 in the fourth embodiment irradiates the laser beam once again by using the feedback control.

As described above, according to the present embodiment, by correcting the movement of the ship 20 loaded with the underwater object destruction system 1, and the influence of tide around the ship 20 or the target object 40, the laser beam can be condensed more precisely.

Fifth Embodiment

Figure 16:
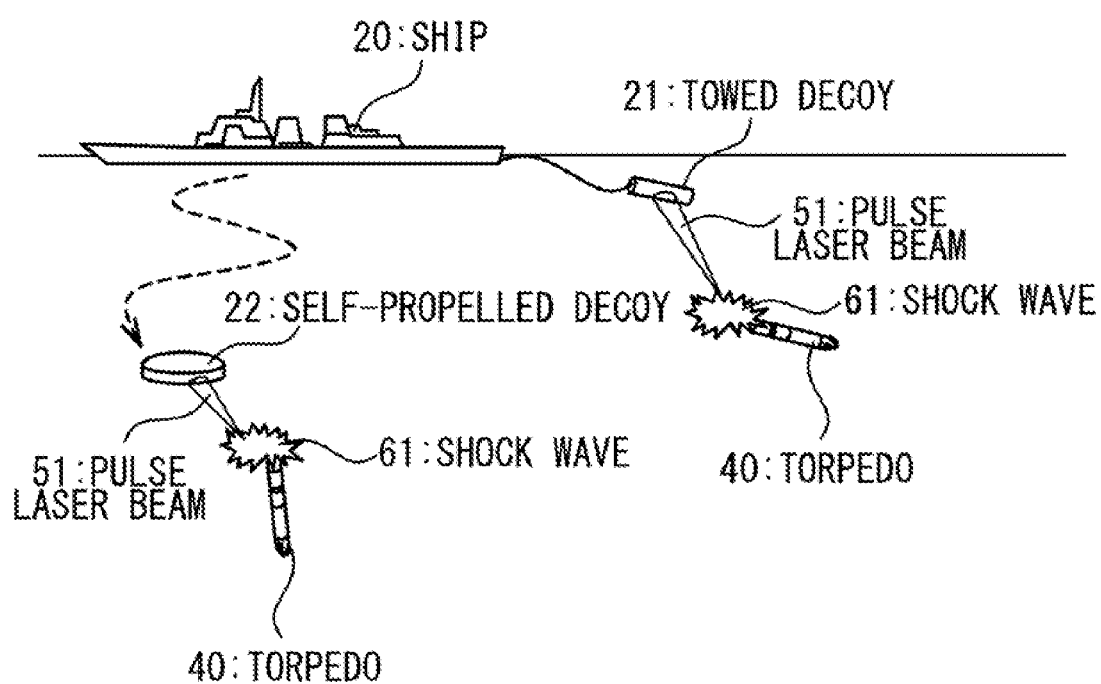
FIG. 16 is a diagram showing a configuration example of the underwater object destruction system according to a fifth embodiment.

If the purpose to destroy the target object 40 which is an underwater object such as a torpedo is to defend the ship 20 against the threat of this target object 40, when the bubble jet 71 and the shock wave 61 are generated by the laser beam irradiated from the ship 20, there is a possibility that the bubble jet 71 and the shock wave 61 are used for another target object 40 to set a guidance target. Therefore, in the fifth embodiment, a laser beam is irradiated from a decoy and so on separated from the ship 20 loaded with the control device 13 and the external system 12. FIG. 16 is a diagram showing a configuration example of the underwater object destruction system 1 in the fifth embodiment. In the configuration example shown in FIG. 16, the towed decoy 21 and the self-propelled decoy 22 are separated from the ship 20.

As shown in FIG. 16, the towed decoy 21 loads an irradiation optical system and irradiates the pulse laser beam 51, to destroy the target object 40 by the shock wave 61 generated as the result. Thus, even if it is supposed that the other target object 40 detects the shock wave 61 generated by the towed decoy 21 and moves for the towed decoy 21, the ship 20 having been separated from the towed decoy 21 can avoid the threat of the other target object 40. Note that the towed decoy 21 may destroy the target object 40 by use of the pulse laser beam or the continuous-wave laser beam 52.

Note that the laser oscillator may be loaded into the towed decoy 21, but because the towed decoy 21 and the ship 20 are physically connected by a tow cable and so on, the laser oscillator may be loaded into the ship 20. That is, in such a case, the laser oscillator and the irradiation optical system are optically connected by using an optical system such as an optical fiber to allow the laser beam emitted from the laser oscillator of the ship 20 to be led to and irradiated from the irradiation optical system of the towed decoy 21.

As shown in FIG. 16, the self-propelled decoy 22 can irradiate the pulse laser beam 51 to destroy the target object 40 by the shock wave 61 generated as the result of irradiation, as well as the towed decoy 21. However, since there is not a physical connection between the ship 20 and the self-propelled decoy 22, it is desirable that the self-propelled decoy 22 loads with the laser oscillator. Note that the self-propelled decoy 22 may destroy the target object 40 by use of the pulse laser beam and may irradiate the continuous-wave laser beam 52.

According to the present embodiments, by irradiating the laser beam from the towed decoy 21 and the self-propelled decoy 22 which are separated from the ship 20, it becomes possible to generate the bubble jet 71 and the shock wave 61 in a distant place from the ship 20. Therefore, the influence on the ship 20 as a defense object by the destruction of the target object 40 such as the torpedo can be reduced.

As above, the present invention has been specifically explained based on the embodiments. However, the present invention is not limited to the embodiments and may be implemented in various forms in a range which does not deviate from the technical idea of the present invention. Also, the features of the embodiments can be freely combined in a range with no technical contradiction.

The present application is based on a Japanese Patent Application No. JP 2016-218229 and claims a profit of priority based on the Japanese Patent Application. The disclosure thereof is incorporated herein by reference.

The invention claimed is:

1. An underwater object destruction system comprising:+
   a detecting device configured to detect a target object in underwater;
   a laser oscillator configured to generate a laser beam;
   an irradiation optical system configured to determine a direction and condensing position of the laser beam from the laser oscillator; and
   a control device configured to control the laser oscillator and the irradiation optical system such that the laser beam is condensed in a target position in underwater, which is separate by a predetermined distance from the target object detected by the detecting device, to vaporize or plasmatize water in the target position, wherein the target object is destroyed by a shock due to an air bubble generated by the vaporization of the water or a shock due to plasma generated by the plasmatization of the water.

2. The underwater object destruction system according to claim 1, wherein the laser oscillator includes a pulse laser oscillator which oscillates a pulse laser beam.

3. The underwater object destruction system according to claim 1, wherein the laser oscillator includes a continuous-wave laser oscillator which oscillates a continuous-wave laser beam.

4. The underwater object destruction system according to claim 2, wherein the laser oscillator further comprises a continuous-wave laser oscillator which oscillates a continuous-wave laser beam.

5. The underwater object destruction system according to claim 1, further comprising:
sonar configured to detect the generation of the air bubble or the plasma due to the laser beam,
wherein the control device carries out a feedback control to adjust an irradiation condition of the laser beam based on the detection result of the generation of the air bubble or the plasma.

6. The underwater object destruction system according to claim 5, wherein the sonar further detects position data of the shock due to the air bubble or the plasma, and
wherein the control device carries out the feedback control to adjust the condensing position of the laser beam based on the detected position data.

7. The underwater object destruction system according to claim 1, further comprising:
a first main unit loaded with the control device; and
a second main unit loaded with the irradiation optical system,
wherein one of the first main unit and the second main unit is separated from the other.

8. The underwater object destruction system according to claim 7, wherein the first main unit is a ship, and wherein the second main unit is a towed decoy which is towed by the ship.

9. The underwater object destruction system according to claim 8, further comprising:
an optical fiber cable configured to lead the laser beam emitted from the laser oscillator to the irradiation optical system,
wherein the laser oscillator is loaded into the ship.

10. An underwater object destruction method comprising:
detecting a target object in underwater;
generating a laser beam;
condensing the laser beam in a target position in underwater, which is separate by a predetermined distance from the detected target object to vaporize or plasmatize water in the target position; and
destroying the target object with a shock due to an air bubble generated by the vaporization of the water or a shock due to plasma generated by the plasmatization of the water.

11. The underwater object destruction method according to claim 10, further comprising:
observing a result of the laser beam being condensed; and
carrying out a feedback control to adjust an irradiation condition of the laser beam, when it is detected from the observation result that the air bubble or the plasma has not been generated in the underwater.

12. The underwater object destruction method according to claim 11, further comprising:
carrying out the feedback control to adjust the condensing position of the laser beam, when it is detected from the observation result that the target object was not destroyed from the observation result.

13. The underwater object destruction method according to claim 10, wherein the generating the air bubble or the plasma in the underwater comprises: generating a plurality of said air bubbles or a plurality of said plasma in the underwater.

* * * * *